United States Patent [19]

Ikenoue

[11] Patent Number: 5,220,566
[45] Date of Patent: Jun. 15, 1993

[54] MULTIPLEXER FOR USE IN DATA PROCESSING SYSTEM

[75] Inventor: Yoshikazu Ikenoue, Osaka, Japan

[73] Assignee: Minolta Camera Kabushiki Kaisha, Osaka, Japan

[21] Appl. No.: 928,091

[22] Filed: Aug. 13, 1992

Related U.S. Application Data

[63] Continuation of Ser. No. 758,494, Sep. 5, 1991, abandoned, which is a continuation of Ser. No. 477,529, Feb. 9, 1990, abandoned.

[30] Foreign Application Priority Data

Feb. 10, 1989 [JP] Japan .................................. 1-31833

[51] Int. Cl.$^5$ .............................. H04J 3/04; G06F 3/12
[52] U.S. Cl. ................................ 370/112; 340/825.1; 395/200
[58] Field of Search ........................................ 364/519

[56] References Cited

U.S. PATENT DOCUMENTS

| H696 | 10/1989 | Davidson | 340/825.08 X |
|---|---|---|---|
| 3,903,507 | 9/1975 | Dillingham | 370/53 |
| 4,100,533 | 7/1978 | Napolitano et al. | 340/825.08 X |
| 4,287,508 | 9/1981 | Arita et al. | 340/825.1 X |
| 4,523,290 | 6/1985 | Donohue et al. | 364/900 |
| 4,525,806 | 6/1985 | Barnes et al. | 364/900 |
| 4,547,880 | 10/1985 | De Vita et al. | 370/61 X |
| 4,667,321 | 5/1987 | Goodman | 370/95.2 |
| 5,047,957 | 9/1991 | Ikenoue | 364/519 |

FOREIGN PATENT DOCUMENTS 62-179241 8/1987 Japan .

OTHER PUBLICATIONS

Instruction manual of a switching unit "Chibi" of model DEB-131 and DEB-134 manufactured by MICON kogyo kabushiki kaisha, Tokyo, Japan, Jan. 10, 1985 (w/ partial translation).

Primary Examiner—Douglas W. Olms
Assistant Examiner—Hassan Kizou
Attorney, Agent, or Firm—Burns, Doane, Swecker & Mathis

[57] ABSTRACT

There is disclosed a multiplexer for communicating between plural first apparatuses and a second apparatus. The multiplexer comprises plural receiver for receiving data transmitted from plural first apparatuses and outputting the received data through a first switch to the second apparatus, respectively, plural transmitter for transmitting data received through a second switch from the second apparatus to plural first apparatuses, respectively, and a controller for controlling the first and second switches, which is operable in first and second operation modes. In the first operation mode, the controller enables the first switch to selectively switch over plural receiver when a predetermined condition is effected, and enables the second switch to selectively switch over plural transmitter accompanying with enabling the first switch. In the second operation mode, the control means enables the second switch to selectively switch over plural transmitter according to data received from the second apparatus.

16 Claims, 23 Drawing Sheets

MULTIPLEXER FOR USE IN DATA PROCESSING SYSTEM

This application is a continuation of application Ser. No. 07/758,494, filed Sep. 5, 1991, (now abandoned), which is a continuation of application Ser. No. 07/477,529, filed Feb. 9, 1990, (now abandoned).

BACKGROUND OF THE INVENTION

1. Field of the Invention

The present invention relates to a multiplexer for use in a data processing system, and more particularly, to a multiplexer for connecting plural data processing units such as computers, word processors, to a printer.

2. Description of Related Art

Conventionally, in order to use a printer in common to plural data processing units such as host computers, word processors, there is provided a multiplexer between the printer and the data processing units. In a conventional multiplexer, there is provided an analogue switch for connecting a printer to one of plural data processing units, and the analogue switch is switched over by manual operation.

Recently, there has been manufactured an automatic scan type multiplexer capable of automatically switching over an analogue switch responsive to a control signal sent from a data processing unit.

On the other hand, a conventional printer performs only a printing operation responsive to data sent from the data processing unit. However, there have been proposed a printer capable of transmitting a response signal to the data processing unit responsive to a command sent therefrom, and also a printer capable of transmitting trouble information thereof to the data processing unit.

However, in the case that such a printer capable of transmitting and receiving data is used in common to plural data processing units, a conventional multiplexer only connects a specified data processing unit to the printer in both the transmission and reception operations. Namely, data outputted from the printer are outputted to only the specified data processing unit which outputs data to the printer.

For example, in the data to be outputted from the printer to the data processing units, there are data having a high emergency to be outputted to plural data processing units simultaneously, and data to be outputted to a data processing unit asynchronously with data received therefrom, namely, data to be outputted to a data processing unit other than a data processing unit from which data are received by the printer. The above-mentioned conventional multiplexer can not handle such data.

SUMMARY OF THE INVENTION

An essential object of the present invention is to provide a multiplexer for connecting plural first apparatuses such as data processing units, host computers, word processors to a second apparatus having a response function such as a printer, being capable of transmitting data such as trouble information having a high emergency to plural or all first apparatuses.

Another object of the present invention is to provide a multiplexer for connecting plural first apparatuses such as data processing units, host computers, word processors to a second apparatus having a response function such as a printer, being capable of transmitting data to a first apparatus asynchronously with data received therefrom, namely, transmitting data to a first apparatus other than the first apparatus from which data are received by the printer.

A further object of the present invention is to provide a multiplexer for connecting plural first apparatuses such as data processing units, host computers, word processors to a second apparatus having a response function such as a printer, being capable of selectively transmitting data to at least one first apparatus responsive to the second apparatus.

In order to accomplish the above objects, according to one aspect of the present invention, there is provided a multiplexer for communicating between plural first apparatuses and a second apparatus, comprising:

plural reception means for receiving data transmitted from said plural first apparatuses, respectively;

first switch means for selectively switching over said plural reception means so as to output the data received by one of said plural reception means to said second apparatus;

plural transmission means for transmitting data received from said second apparatus to said plural first apparatuses, respectively;

second switch means for selectively switching over said plural transmission means so as to output the data received from said second apparatus through said transmission means to at least one of said plural first apparatus; and control means for controlling said first and second switch means, which is operable in the following first and second operation modes:

in said first operation mode, said control means enabling said first switch means to selectively switch over said plural reception means when a predetermined condition is effected, and enabling said second switch means to selectively switch over said plural transmission means corresponding to said first switch means; and in said second operation mode, said control means enabling said second switch means to selectively switch over said plural transmission means according to the data received from said second apparatus.

According to another aspect of the present invention, there is provided a multiplexer comprising:

plural reception means for receiving first data, respectively;

first switch means for selectively switching over said plural reception means so as to output the first data received by one of said plural reception means;

plural transmission means for transmitting second data, respectively;

second switch means for selectively switching over said plural transmission means so as to output the second data through said transmission means; and control means for controlling said first and second switch means, which is operable in the following first and second operation modes:

in said first operation mode, said control means enabling said first switch means to selectively switch over said plural reception means when a predetermined condition is effected, and enabling said second switch means to selectively switch over said plural transmission means corresponding to said first switch means; and in said second operation mode, said control means enabling said second switch means to selectively switch over said plural transmission means according to the second data.

According to a further aspect of the present invention, there is provided a multiplexer for communicating between plural data processing units and a printer, comprising:

plural reception means for receiving data transmitted from said plural data processing units, respectively;

first switch means for selectively switching over said plural reception means so as to output the data received by one of said plural reception means to said printer;

plural transmission means for transmitting data received from said printer to said plural data processing units, respectively;

second switch means for selectively switching over said plural transmission means so as to output the data received from said printer through said transmission means to at least one of said plural data processing unit; and control means for controlling said first and second switch means, which is operable in the following first and second operation modes:

in said first operation mode, said control means enabling said first switch means to selectively switch over said plural reception means when a predetermined condition is effected, and enabling said second switch means to selectively switch over said plural transmission means corresponding to said first switch means; and in said second operation mode, said control means enabling said second switch means to selectively switch over said plural transmission means according to the data received from said printer.

BRIEF DESCRIPTION OF THE DRAWINGS

These and other objects and features of the present invention will become clear from the following description taken in conjunction with the preferred embodiment thereof with reference to the accompanying drawings, in which:

FIG. 18 is a flowchart showing a CCUB transmission process shown in FIGS. 19 and 22a;

DETAILED DESCRIPTION OF THE PREFERRED EMBODIMENT

A preferred embodiment according to the present invention will be described below in the order of the following items, with reference to the attached drawings.

Figure 1:
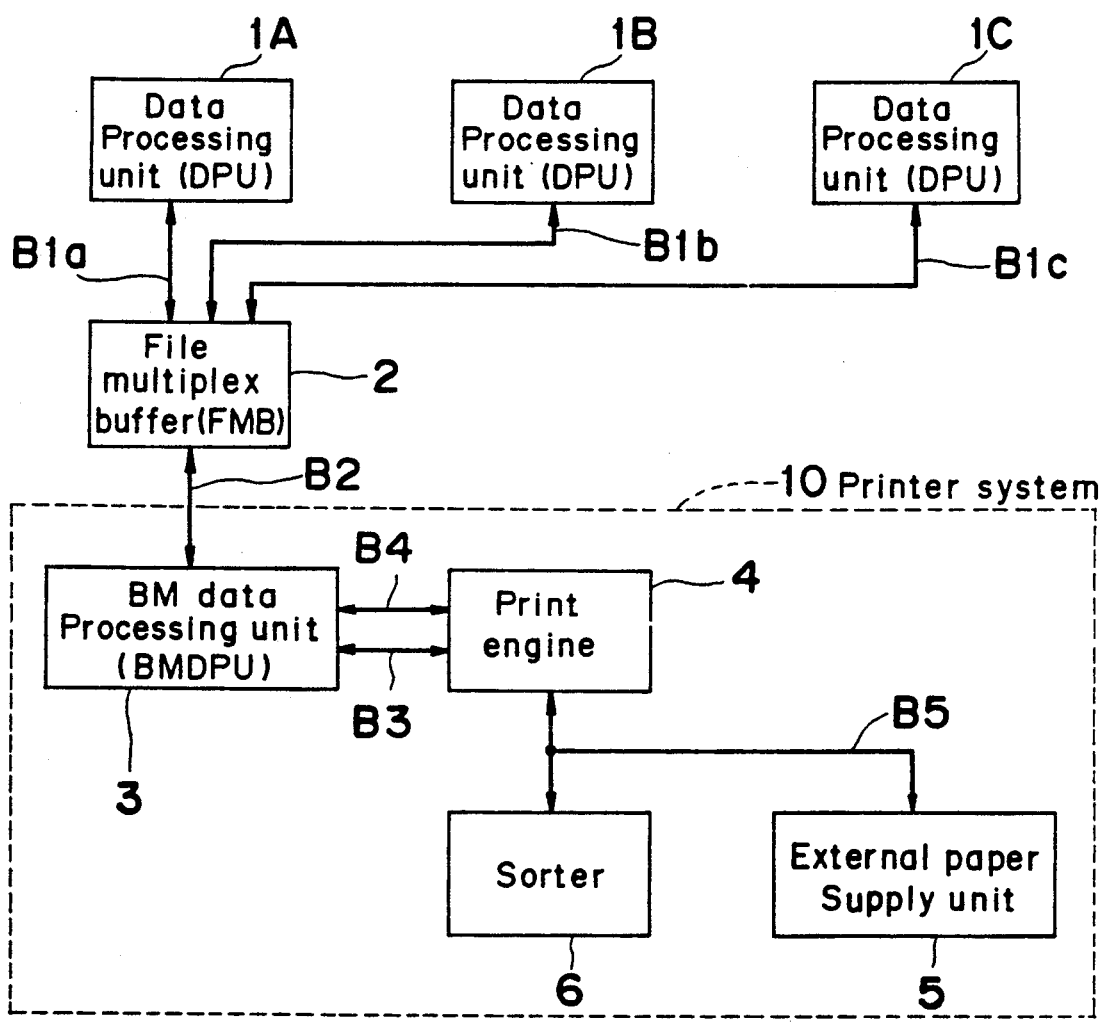
FIG. 1 is a block diagram showing a printer network system of a preferred embodiment according to the present invention.

(a) Printer network system
(b) Printer system
(c) File multiplex buffer (FMB)
  (c-1) Microprocessing unit (MPU)
  (c-2) RAM of File multiplex buffer (FMB)
  (c-3) Selector
(d) Timing chart of data reception operation of FMB upon receiving data from DPUs
(e) Relationship between Memory capacity of empty area in RD buffer area of RAM of FMB and Reception enable signal RE
(f) Timing upon transmitting data from FMB to DPUs
(g) Control flow of MPU
(h) Modifications (a) Printer network system FIG. 1 shows a printer network system of the preferred embodiment according to the present invention.

Referring to FIG. 1, the printer network system of the preferred embodiment comprises a printer system 10, three data processing units (referred to as DPUs hereinafter) 1A, 1B and 1C such as host computers, and a file multiplex buffer (referred to as an FMB hereinafter) 2 which is connected between the printer system 10 and each of the DPUs 1A, 1B and 1C.

In the printer network, data outputted from the DPUs 1A, 1B and 1C are once stored into the FMB 2 through communication lines B1a, B1b and B1c, respectively, and thereafter, the data stored in the FMB 2 are outputted to a bit map type data processing unit (referred to as a BMDPU hereinafter) 3 of the printer system 10. On the other hand, data such as status information of the printer system 10 are outputted from the printer system 10 to the DPUs 1A, 1B and 1C through the FMB 2.

The printer system 10 includes the BMDPU 3, a print engine 4 including a laser and an electrophotographic printer, and accessory apparatuses such as an external paper supply unit 5, a sorter 6 and the like.

(b) Printer system

Figure 2:
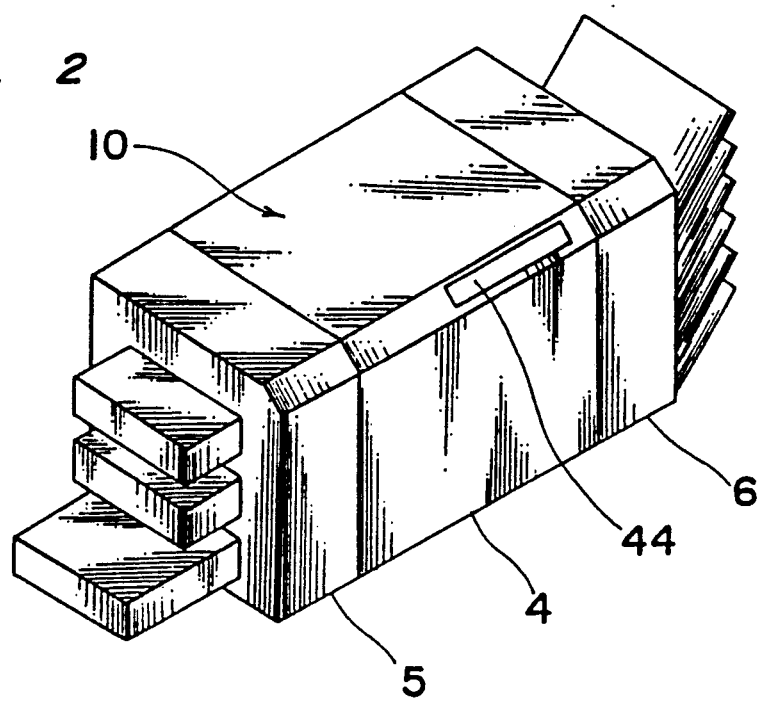
FIG. 2 is a perspective view showing a printer system shown in FIG. 1.

FIG. 2 is a perspective view showing the printer system 10 shown in FIG. 1.

Referring to FIG. 2, the print engine 4 installs the BMDPU 3 therein, and the external paper supply unit 5 and the sorter 6 are assembled to the print engine 4. On a front edge portion of the upper surface of the main body of the print engine 4, there is provided an operation panel 44 having a display for displaying various indications regarding the printer system and keys for inputting data and commands.

Figure 3:
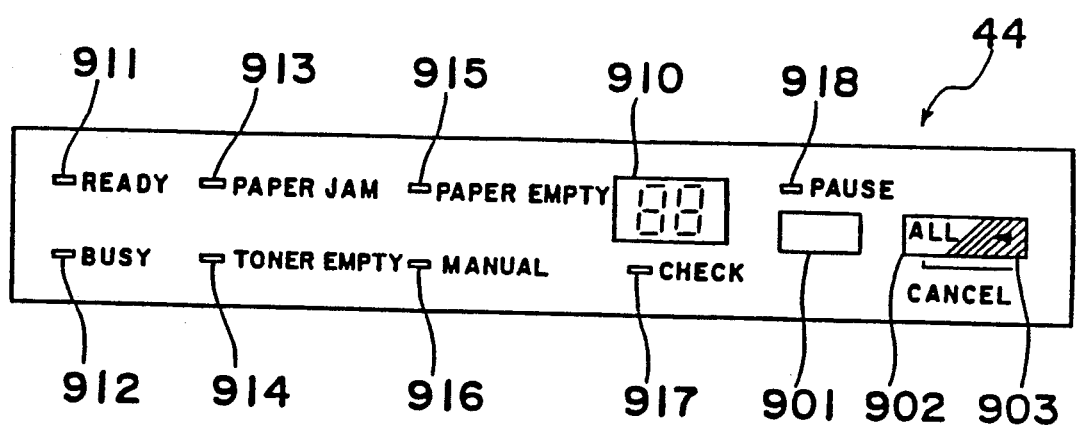
FIG. 3 is a top plan view showing an operation panel of the printer system shown in FIG. 2.

FIG. 3 is a top plan view showing the operation panel 44 shown in FIG. 2.

Referring to FIG. 3, on the operation panel 44, there are arranged entry keys 901 to 903, and indicators 910 to 918 for indicating various kinds of operation states of the printer system 10. The key 901 is a PAUSE key for interrupting a printing operation. The key 902 is a TEST key for performing a test printing operation. The key 903 is a SHIFT key, and the SHIFT key 903 becomes a CANCEL key for stopping the printing operation when it is pressed together with the TEST key 902. The reason why the CANCEL function becomes effective only when both of keys 902 and 903 are pressed simultaneously is to avoid an undesirable cancel by a careless operation.

Figure 4:
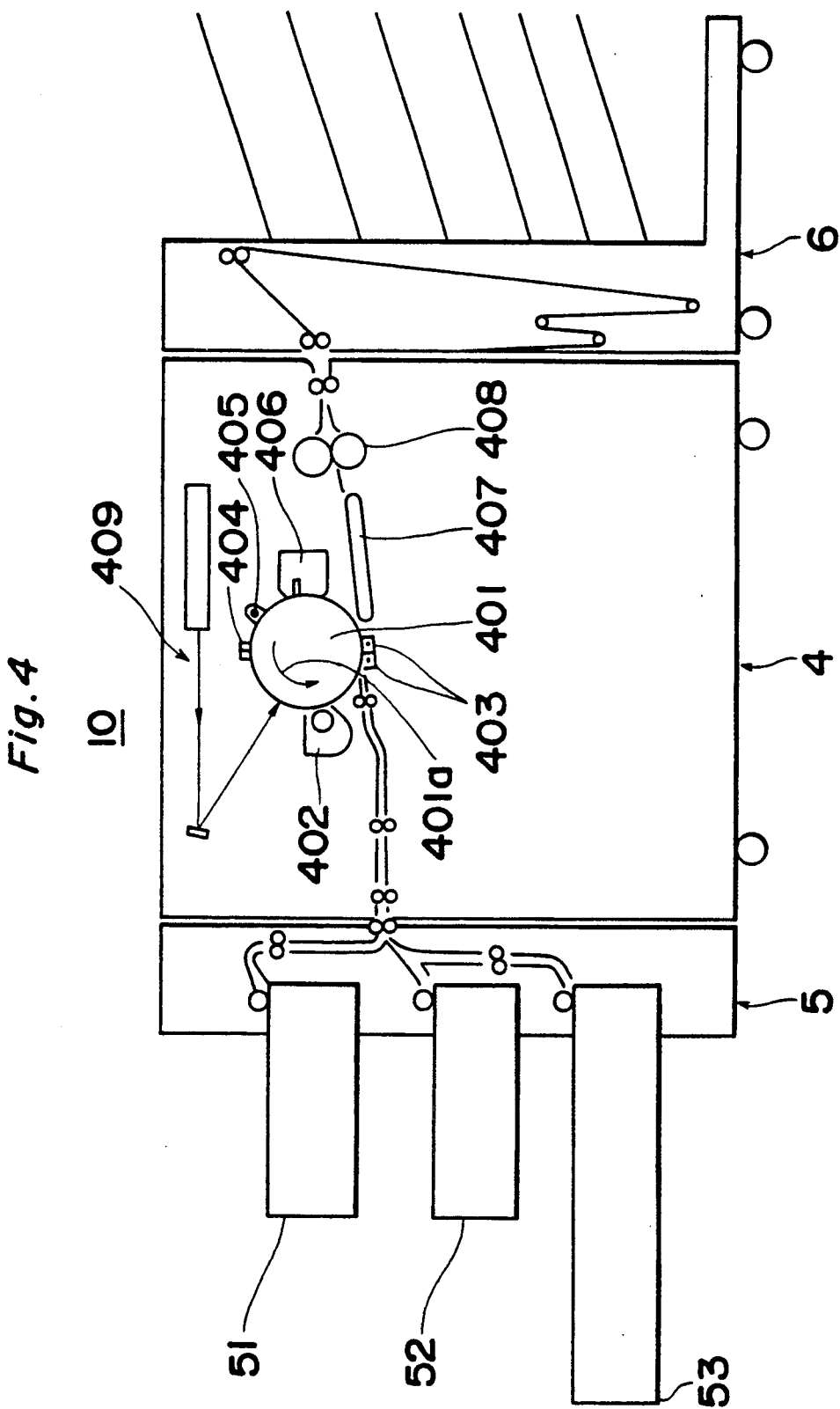
FIG. 4 is a schematic cross sectional view showing the printer system shown in FIGS. 1 and 2.

FIG. 4 is a schematic cross sectional view showing the printer system 10.

Referring to FIG. 4, there are detachably mounted three paper feeding cassettes 51 to 53 onto the external paper supply unit 5. A piece of printing paper set on preselected one of the paper feeding cassettes 51 to 53 is fed to the inside of the print engine 4.

In the center portion of the print engine 4, there is arranged a photoconductive drum 401. Around the photoconductive drum 401, there are arranged a developing unit 402, a corona charger 404, an eraser lamp 405, a toner cleaner 406, and a transfer charger 403. After the surface of the photoconductive drum 401 is cleaned by the toner cleaner 406 so as to remove toner remaining thereon, it is uniformly electrified by the corona charger 404 and the eraser lamp 405, and then, it is exposed to light reflected from a document (not shown) through an optical system 409 so that an electrostatic latent image of the document is formed on the photoconductive drum 401. Thereafter, the electrostatic latent image is developed with toner by the developing unit 402 so as to form a toner image thereon, and the toner image is transferred onto a piece of printing paper fed from one of the paper feeding cassettes 51 to 53 by the transfer charger 403. Then, the printing paper is transported to a fixing unit 408 by a transportation belt 407, and the toner image which has been transferred on the printing paper is fixed by the fixing unit 408. Finally, the printing paper is discharged to the sorter 6.

Figure 5:
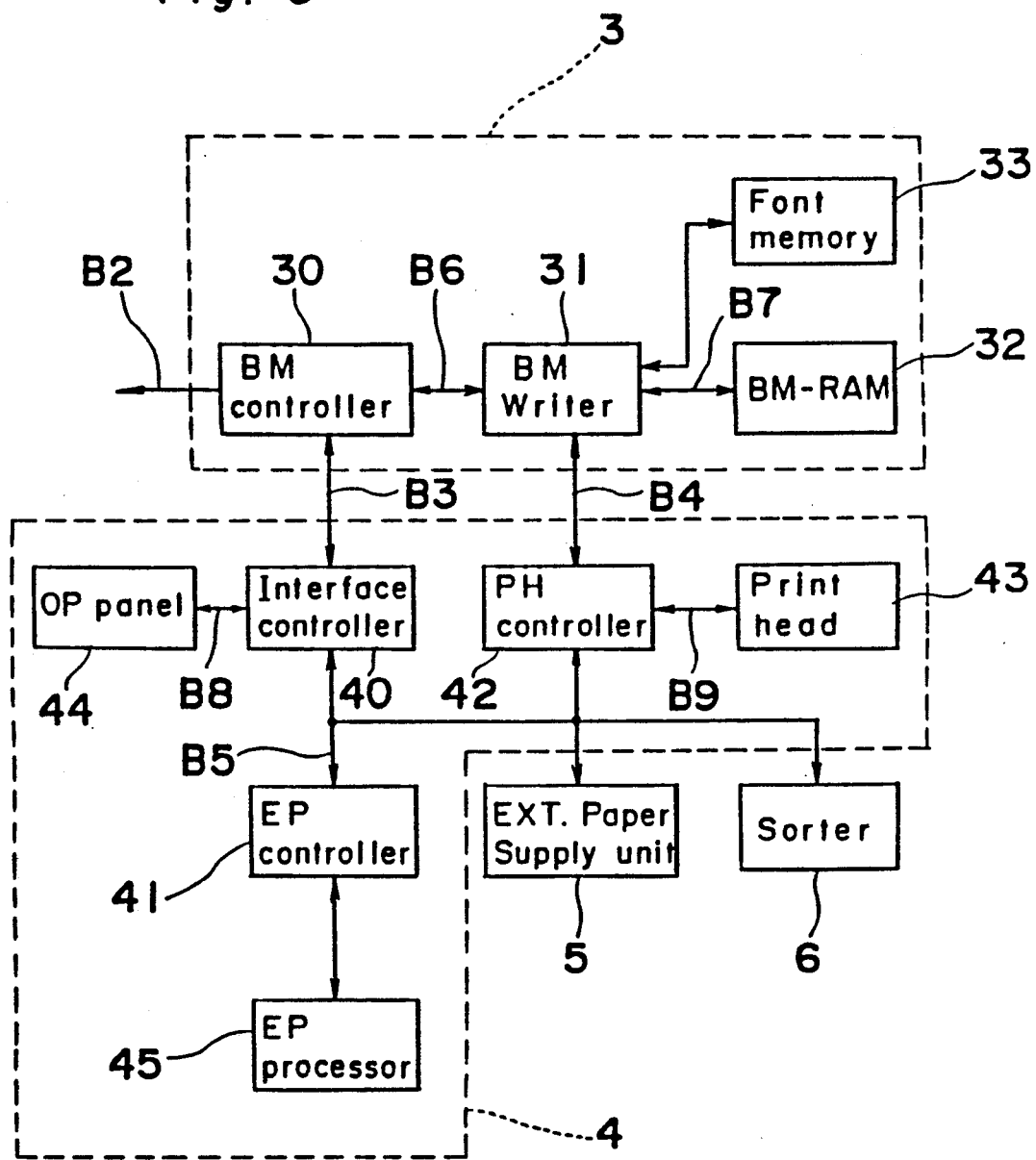
FIG. 5 is a block diagram showing a bit map data processing unit, a print engine, and peripheral units thereof shown in FIG. 1.

FIG. 5 is a block diagram of the BMDPU 3 and the print engine 4 shown in FIG. 1.

The BMDPU 3 comprises a bit map controller (referred to as a BMC hereinafter) 30, a bit map random access memory (referred to as a BM-RAM hereinafter) 32, a bit map writer (referred to as a BMW hereinafter) 31 for imaging bit images on the BM-RAM 32, and a font memory 33, which are connected to each other as shown in FIG. 5. Namely, the BMC 30 is connected to the BMW 31 through an internal bus B6, and the BMW 31 is connected to the BM-RAM 32 through an internal bus B7.

The font memory 33 is composed of a ROM for storing predetermined fonts and a RAM for storing fonts which are down-loaded thereto. The BMDPU 3 communicates with the print engine 4, and vice versa, through a bus B3 for control data such as a number of prints, an accessory control signal and the like, and through a bus B4 for image data.

The print engine 4 mainly comprises an interface controller 40, an electrophotographic process controller 41, and a print head controller 42.

The interface controller 40 processes the control data outputted from the BMC 30, controls the operation of the operation panel 44 and controls operation timings of respective controllers of the print engine 4 through an internal bus B5. The electrophotographic process controller 41 controls the operation of an electrophotographic processor 45 according to data sent from the interface controller 40 through the internal bus B5.

The print head controller 42 controls emitting of a semiconductor laser (not shown) and the rotation of a polygon mirror (not shown), both of which are provided in a print head 43, according to information sent from the interface controller 40 through the internal bus B5 in order to write image data sent from the BMW 31 through the internal bus B4, on the photoconductor drum 401. Also, the operation of each of the external paper supply unit 5, and the sorter 6 is controlled through the internal bus B5 by the interface controller 40.

As described above, the printer system 10 comprises the bit map type laser printer. In the printer system 10, printing data such as character code which are sent from the DPUs 1A, 1B and 1C are developed as a practical printing image onto the BM-RAM 32 of the BMDPU 3, and thereafter, the data are outputted to the print engine 4. The print engine 4 modulates laser light emitted from semiconductor laser according to the data sent from the BMDPU 3 and projects it onto the photoconductive drum 401 so as to form an electrostatic latent image thereon. The electrostatic latent image is developed with toner so as to form a toner image thereon, and then, the toner image is transferred onto a piece of printing paper as described above.

Data sent from the DPUs 1A, 1B and 1C further include various kinds of codes for controlling a format upon printing data on a piece of printing paper and for setting operation modes of the print engine 4, in addition to the printing data.

BMDPU 3 performs an analysis of the protocol of the printing data in addition to processing of the printing data, and outputs instructions to the print engine with respect to control of the printing format, paper feeding, mode alternation for optional operations. The print engine 4 performs not only printing control but also control of the electrophotographic process and timing control of the printing paper accompanying therewith, and further performs a processing synchronously with the paper feeding control for the other optional units.

The control operation of the print engine 4 is similar to that of a conventional electrophotographic copying machine which is well known in those skilled in the art.

Figure 6:
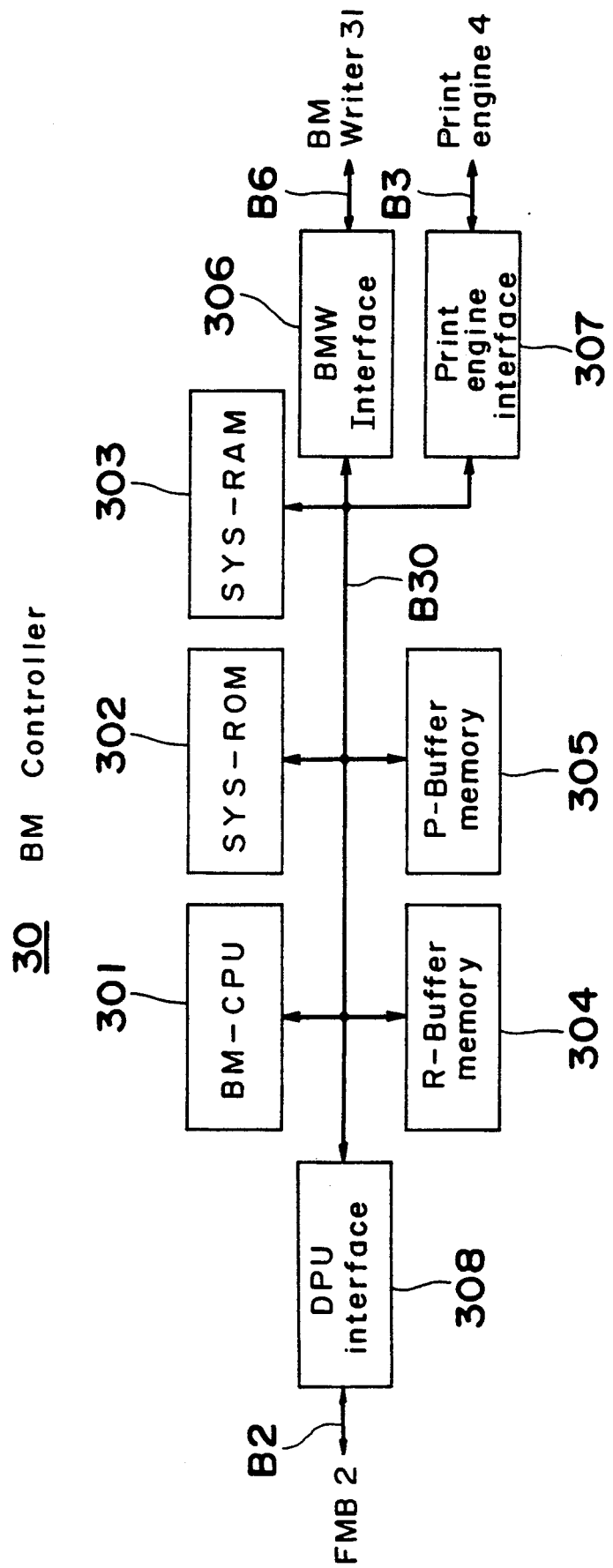
FIG. 6 is a block diagram showing a bit map controller shown in FIG. 5.

FIG. 6 is a block diagram showing the BMC 30 shown in FIG. 5.

Referring to FIG. 6, the BMC 30 comprises a bit map central processing unit (referred to as a BM-CPU hereinafter) 301, a system read only memory (referred to as a SYS-ROM) 302, a system random access memory (referred to as a SYS-RAM hereinafter) 303, a reception buffer memory (referred to as an R-buffer memory hereinafter) 304, a packet buffer memory (referred to as a P-buffer memory hereinafter) 305, a BMW interface 306, a print engine interface 307, and a DPU interface 308, which are connected to each other through an internal bus B30. The DPU interface 308 is connected to the FMB 2 through the external bus B2. The BMW interface 306 is connected to the BMW 31, and the print engine interface 307 is connected to the print engine 4 through the external bus B3.

The BM-CPU 301 is a central controller of the BMDPU 3, and communicates with not only either one of the DPUs 1A, 1B and 1C but also the FMB 2 through the DPU interface 308. The BM-CPU 301 converts printing data sent from either one of the DPUs 1A, 1B and 1C into predetermined data, and controls not only the BMW 31 through the BMW interface 306 but also the print engine 4 through the print engine interface 307.

The SYS-ROM 302 stores a system program of the BMCPU 301. The SYS-RAM 303 is used as a working area of the BM-CPU 301, and stores stacks and fundamental parameters and flags.

The R-buffer memory 304 is a buffer memory for communicating with the DPUs 1A, 1B and 1C, and the FMB 2, in order to perform the above communication therewith asynchronously with performing the system program of the BM-CPU 301. The P-buffer memory 305 is an FIFO memory for storing data sent from the DPUs 1A, 1B and 1C as intermediate code (referred to as a packet hereinafter) which it is easy to image on the BM-RAM 32 according to the font attribute. The practical imaging operation is performed in the BMW 31, and it is necessary to calculate parameters such as addresses of the font at which a font pattern is stored, an imaging address when data are imaged onto the BM-RAM 32, as information to be outputted to the BMW 31. It takes a predetermined time to calculate them. Therefore, data of the next page are processed using the P-buffer memory 305 of the FIFO upon printing data stored in the BM-RAM 32 so as to perform the above processes in a higher speed.

Furthermore, the BM-CPU 301 communicates with the print engine 4 through the print engine interface 307. For example, the BM-CPU 301 outputs a JOB control command such as a PRINT command to the print engine 4 through the print engine interface 307 and the bus B3.

(c) File multiplex buffer (FMB)

Figure 7:
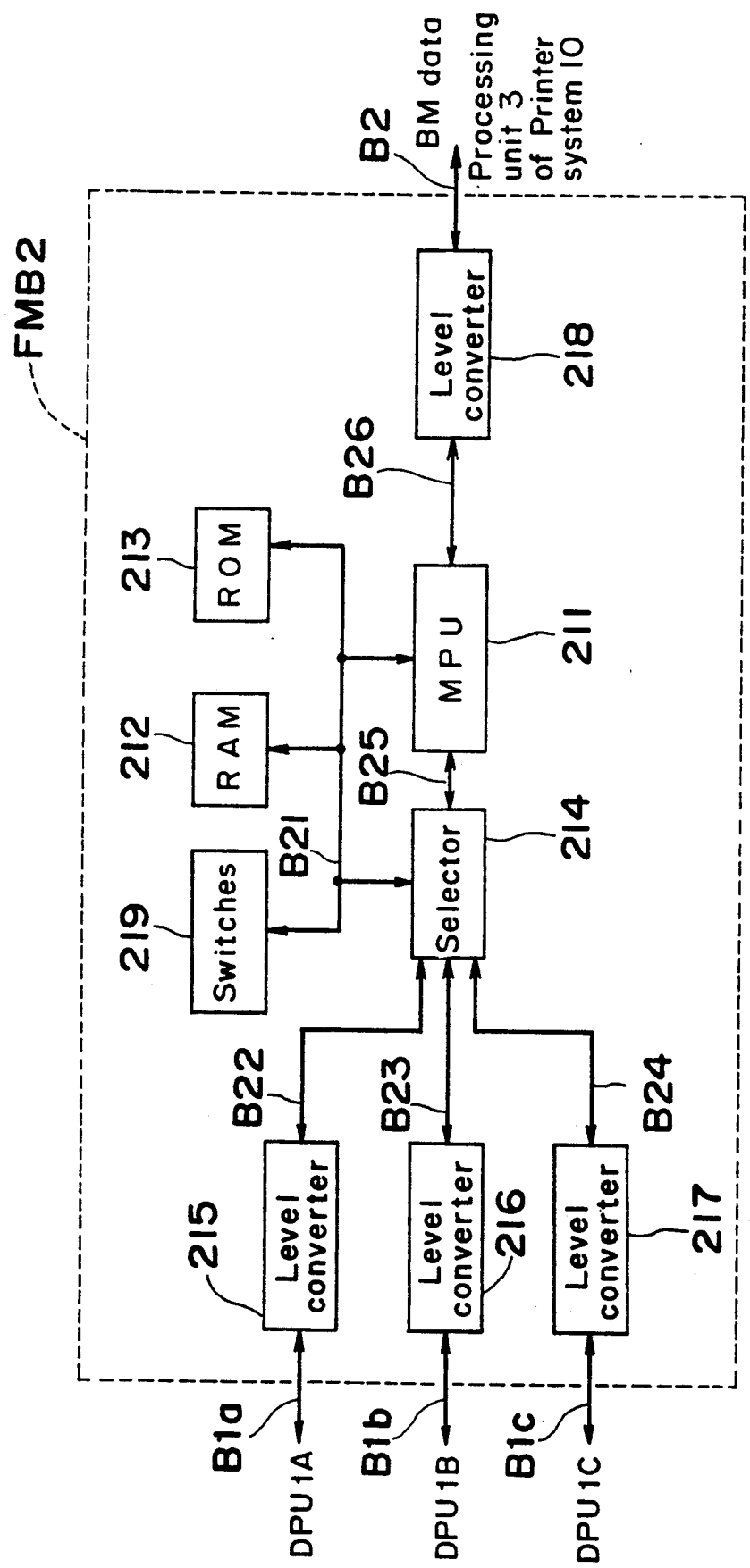
FIG. 7 is a block diagram showing a file multiplex buffer shown in FIG. 1.

FIG. 7 is a block diagram showing the FMB 2 having a multiplexer function and a buffer memory function.

Referring to FIG. 7, the FMB 2 comprises a microprocessing unit (referred to as an MPU hereinafter) 211 capable of controlling two channel communication lines B25 and B26, which are connected to a selector 214 and a level converter 218, respectively.

The FMB 2 further comprises a ROM 213 for storing a system program of the MPU 211, a RAM for being used as not only a working area of the MPU 211 but also a data buffer memory upon communicating through the communication lines B25 and B26, and switches 219 for setting operation conditions of the FMB 2, which are connected to each other through an internal bus B21.

Furthermore, the FMB 2 comprises level converters 215 to 217 for converting signals of data sent from the DPUs 1A, 1B and 1C through the external bus B1a, B1b and B1c into signals each signal having a predetermined internal logic level, and outputting the converted signals into the selector 214, through internal buses B22, B23 and B24, respectively, and vice versa. The selector 214 is controlled through the internal bus B21 by the MPU 211.

On the other hand, the MPU 211 communicates with the BMDPU 3 of the printer system 10 through the internal bus B26, the level converter 218, and the external bus B2.

(c-1) Microprocessing unit (MPU)

Figure 8:
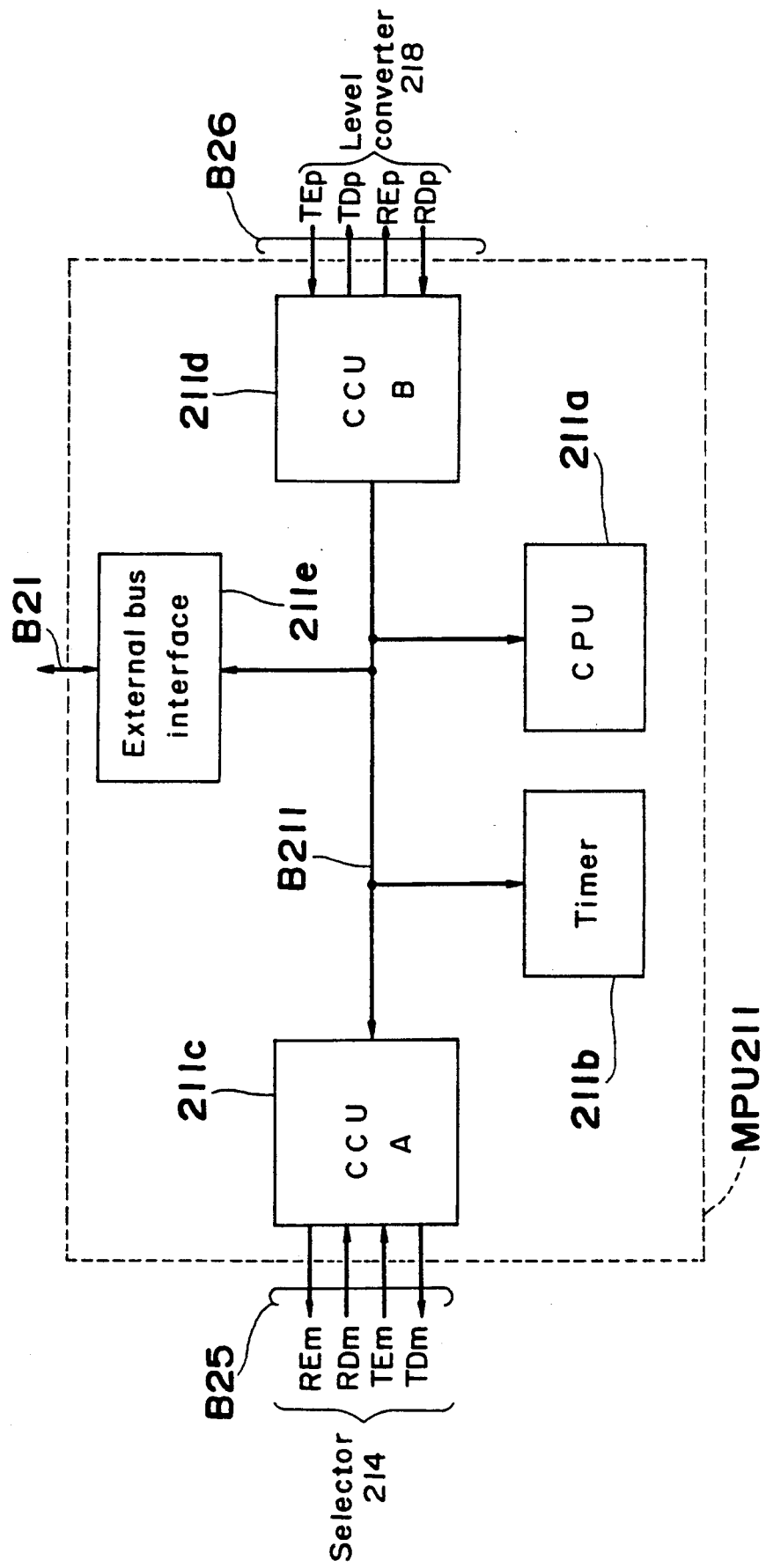
FIG. 8 is a block diagram showing a microprocessing unit shown in FIG. 7.

FIG. 8 is a block diagram showing the MPU 211 shown in FIG. 7.

Referring to FIG. 8, the MPU 211 comprises a CPU 211a for controlling processes of the MPU 211. The MPU 211 further comprises a timer 211b, a communication control unit A (referred to as a CCUA hereinafter) 211c, a communication control unit B (referred to as a CCUB hereinafter) 211d, and an external bus interface 211e, which are controlled by the CPU 211a through an internal bus B211.

The timer 211b controls operation timings of processes executed in the MPU 211, and the timer 211b outputs interruption signals to the CPU 211a through the internal bus B211. The CCUA 211c communicates with the DPUs 1A, 1B and 1C using a reception enable signal REm, reception data RDm, a transmission enable signal TEm, and transmission data TDm, wherein the reception enable signal REm is provided for informing the DPUs 1A, 1B and 1C whether or not the CCUA 211c can receive the reception data RDm, and the transmission enable signal TEm is provided for informing the CCUA 211c whether or not the DPUs 1A, 1B and 1C can receive the transmission data TDm.

On the other hand, the CCUB 211d communicates with the BMDPU 3 of the printer system 10 using a transmission enable signal TEp, transmission data TDp, a reception enable signal REp and reception data RDp, wherein the reception enable signal REp is provided for informing the BMDPU 3 of the printer system 10 whether or not the CCUB 211d can receive the reception data RDp, and the transmission enable signal TEp is provided for informing the CCUB 211d whether or not the BMDPU 3 of the printer system 10 can receive the transmission data TDp. It is to be noted that, the external bus interface 211e is used when the CPU 211a executes a system program stored in the ROM 213, and the CPU 211a accesses the RAM 212.

(c-2) RAM of File multiplex buffer (FMB)

Figure 10:
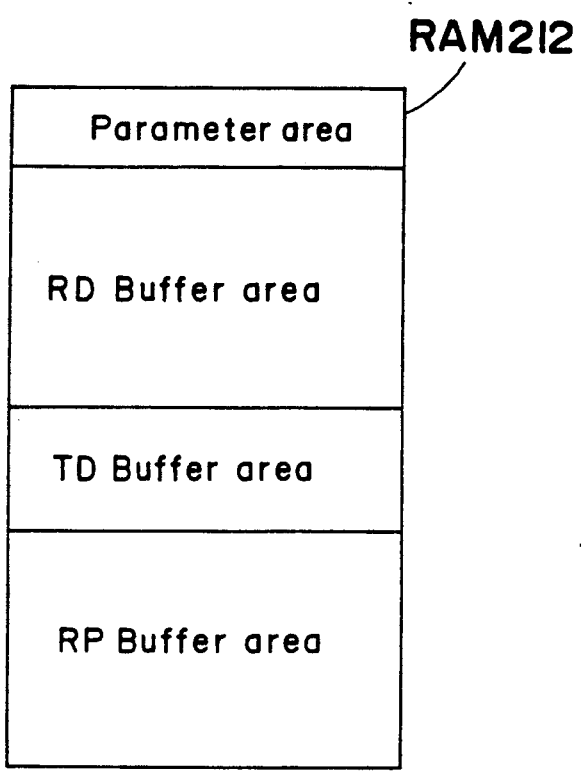
FIG. 10 is a memory map of a random access memory shown in FIG. 7.

FIG. 10 is a memory map of the RAM 212 shown in FIG. 7.

Referring to FIG. 10, the memory area of the RAM 212 is composed of a parameter area, an RD buffer area, a TD buffer area and an RP buffer area.

The parameter area is provided for storing parameters and flags used when the system program stored in the ROM 213 is executed by the MPU 211, and the RD buffer area is provided for storing data which are received from the DPUs 1A, 1B and 1C and are transmitted to the printer system 10. The TD buffer area is provided for storing data which are outputted to the DPUs 1A, 1B and 1C, and the RP buffer area is provided for storing data which are received from the printer system 10.

(c-3) Selector

Figure 9:
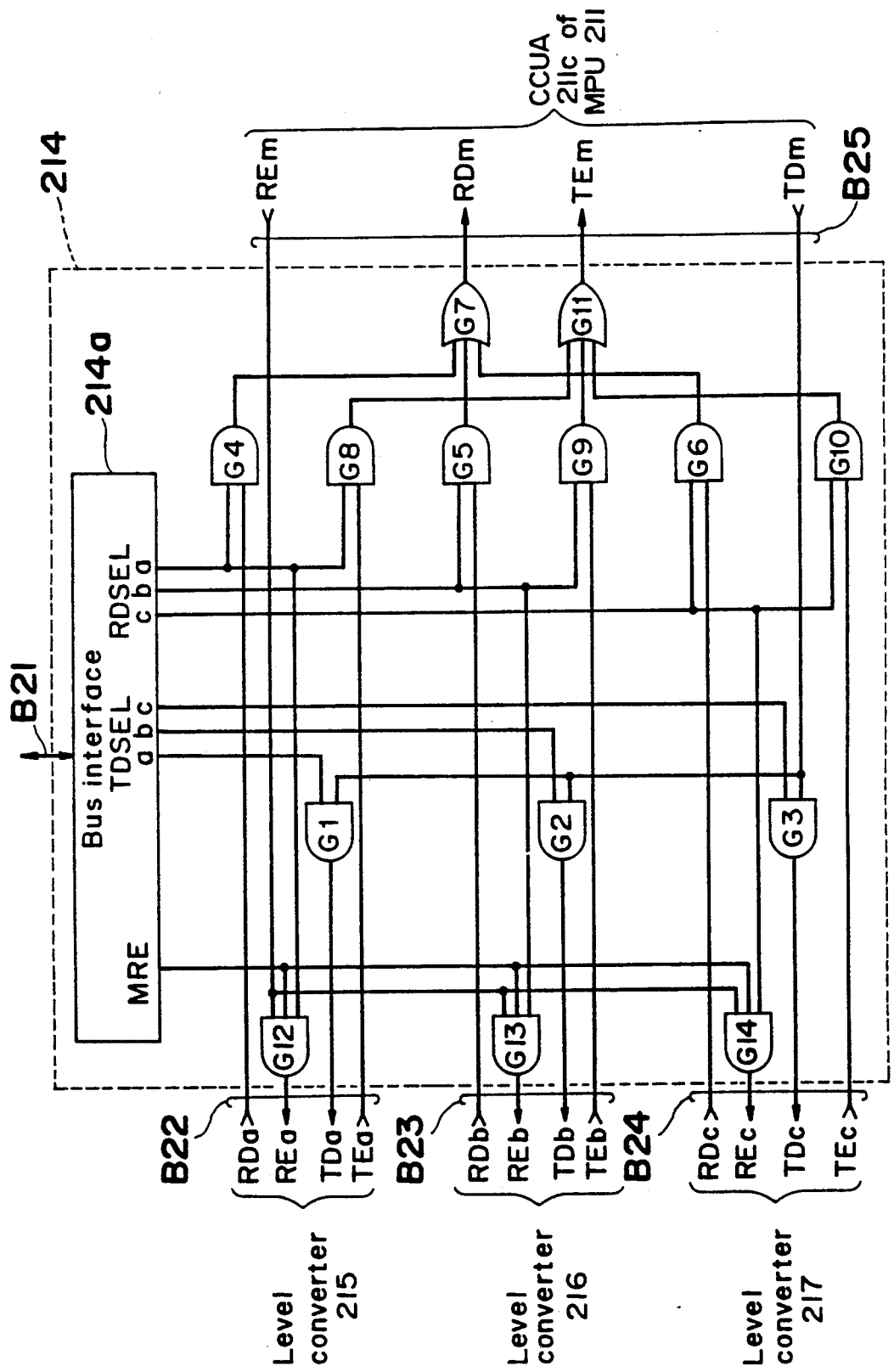
FIG. 9 is a block diagram showing a selector shown in FIG. 7.

FIG. 9 is a block diagram showing the selector 214 shown in FIG. 7.

Referring to FIG. 9, the bus B22 which is connected to the DPU 1A through the level converter 215 is composed of four signal lines for transmitting reception data RDa, a reception enable signal REa, transmission data TDa and a transmission enable signal TEa, the bus B23 which is connected to the DPU 1B through the level converter 216 is composed of four signal lines for transmitting reception data RDb, a reception enable signal REb, transmission data TDb and a transmission enable signal TEb, and the bus B24 which is connected to the DPU 1C through the level converter 217 is composed of four signal lines for transmitting reception data RDc, a reception enable signal REc, transmission data TDc and a transmission enable signal TEc.

When the reception enable signal REa is turned on, it informs the DPU 1A that the FMB 2 can receive the reception data RDa. When the reception enable signal REb is turned on, it informs the DPU 1B that the FMB 2 can receive the reception data RDb. When the reception enable signal REc is turned on, it informs the DPU 1C that the FMB 2 can receive the reception data RDc. Furthermore, when the transmission enable signal TEa is turned on, it informs the FMB 2 that the DSU 1A can receive the transmission data TDa and the FMB 2 is permitted to transmit them. When the transmission enable signal TEb is turned on, it informs the FMB 2 that the DSU 1B can receive the transmission data TDb and the FMB 2 is permitted to transmit them. When the transmission enable signal TEc is turned on, it informs the FMB 2 that the DSU 1C can receive the transmission data TDc and the FMB 2 is permitted to transmit them.

On the other hand, the bus B25 which is connected to the CCUA 211c of the MPU 211 is composed of four signal lines for transmitting reception enable signal REm, reception data RDm, a transmission signal TEm and transmission data TDm. When the reception enable signal REm is turned on, it informs the DPUs 1A, 1B and 1C that the FMB 2 can receive the reception data RDm. Furthermore, when the transmission enable signal TEm is turned on, it informs the FMB 2 that either the DPUs 1A, 1B or 1C can receive the transmission data TDm and the FMB 2 is permitted to transmit them.

The MPU 211 outputs one or all of selection signals RDSELa, RDSELb and RDSELc, one or all of selection signals TDSELa, TDSELb and TDSELc, and selection signal MRE, which are provided for controlling the selector 214, through a bus interface 214a to AND gates G1 to G6, G8 to G10, and G12 to G14. It is to be noted that the selection signal MRE is provided for permitting or inhibiting the data reception operation with respect to data received from the DPUs 1A, 1B and 1C by software, even though the FMB can receive data transmitted from the DPUs 1A, 1B and 1C, namely, even though there is an empty area in the RD buffer area of the RAM 212.

The bus interface 214a outputs the selection signal RDSELa to respective first input terminals of the AND gates G4, G8 and G12, outputs the selection signal RDSELb to respective first input terminals of the AND gates G5, G9 and G13, and outputs the selection signal RDSELc to respective first input terminals of the AND gates G6, G10 and G14. Further, the bus interface 214a outputs the selection signal TDSELa to a first input terminal of the AND gate G1, outputs the selection signal TDSELb to a first input terminal of the AND gate G2, and outputs the selection signal TDSELc to a first input terminal of the AND gate G3. Furthermore, the bus interface 214a outputs the selection signal MRE to respective second input terminals of the AND gates G12, G13 and G14.

Respective output terminals of the AND gates G4 to G6 are connected to respective input terminals of an OR gate G7. Respective output terminals of the AND gates G8 to G10 are connected to the respective input terminals of an OR gate G11.

The reception data RDa, RDb and RDc which are transmitted from the DPUs 1A, 1B and 1C through the level converters 215 to 217 are inputted to second input terminals of the AND gates G4 to G6, respectively. The transmission enable signals TEa, TEb and TEc which are transmitted from the DPUs 1A, 1B and 1C through the level converters 215 to 217 are inputted to second input terminals of the AND gates G8 to G10, respectively.

When the MPU 211 outputs the turned on selection signal RDSELa through the bus interface 214a to respective first input terminals of the AND gates G4 and G8, the reception data RDa are enabled to be outputted as the reception data RDm to the CCUA 211c of the MPU 211 through the OR gate G7 and the bus B25, and also the transmission enable signal TEa is enabled to be outputted as the transmission enable signal TEm to the CCUA 211c of the MPU 211 through the OR gate G11 and the bus B25. When the MPU 211 outputs the turned on selection signal RDSELb through the bus interface 214a to respective first input terminals of the AND gates G5 and G9, the reception data RDb are enabled to be outputted as the reception data RDm to the CCUA 211c of the MPU 211 through the OR gate G7 and the bus B25, and also the transmission enable signal TEb is enabled to be outputted as the transmission enable signal TEm to the CCUA 211c of the MPU 211 through the OR gate G11 and the bus B25. When the MPU 211 outputs the turned on selection signal RDSELc through the bus interface 214a to respective first input terminals of the AND gates G6 and G10, the reception data RDc are enabled to be outputted as the reception data RDm to the CCUA 211c of the MPU 211 through the OR gate G7 and the bus B25, and also the transmission enable signal TEc is enabled to be outputted as the transmission enable signal TEm to the CCUA 211c of the MPU 211 through the OR gate G11 and the bus B25.

The transmission data TDm which are transmitted from the CCUA 211c of the MPU 211 through the bus B25 are inputted to respective second input terminals of the AND gates G1 to G3. The reception enable signal REm which is transmitted from the CCUA 211c of the MPU 211 through the bus B25 is inputted to respective third input terminals of the AND gates G12 to G14.

When the MPU 211 outputs the turned on selection signal TDSELa through the bus interface 214a to the first input terminal of the AND gate G1, the transmission data TDm are enabled to be outputted as the transmission data TDa to the DPU 1A through the level converter 215. When the MPU 211 outputs the turned on selection signal TDSELb through the bus interface 214a to the first input terminal of the AND gate G2, the transmission data TDm are enabled to be outputted as the transmission data TDb to the DPU 1B through the level converter 216. When the MPU 211 outputs the turned on selection signal TDSELc through the bus interface 214a to the first input terminal of the AND gate G3, the transmission data TDm are enabled to be outputted as the transmission data TDc to the DPU 1C through the level converter 217.

Furthermore, when the MPU 211 outputs the turned on selection signals RDSELa and MRE through the bus interface 214a to the second input terminal of the AND gate G12 and the first input terminal thereof, respectively, the reception enable signal REm is enabled to be outputted as the reception enable signal REa to the DPU 1A through the level converter 215. When the MPU 211 outputs the turned on selection signals RDSELb and MRE through the bus interface 214a to the second input terminal of the AND gate G13 and the first input terminal thereof, respectively, the reception enable signal REm is enabled to be outputted as the reception enable signal REb to the DPU 1B through the level converter 216. When the MPU 211 outputs the turned on selection signals RDSELc and MRE through the bus interface 214a to the second input terminal of the AND gate G14 and the first input terminal thereof, respectively, the reception enable signal REm is enabled to be outputted as the reception enable signal REc to the DPU 1C through the level converter 217.

Figure 12:
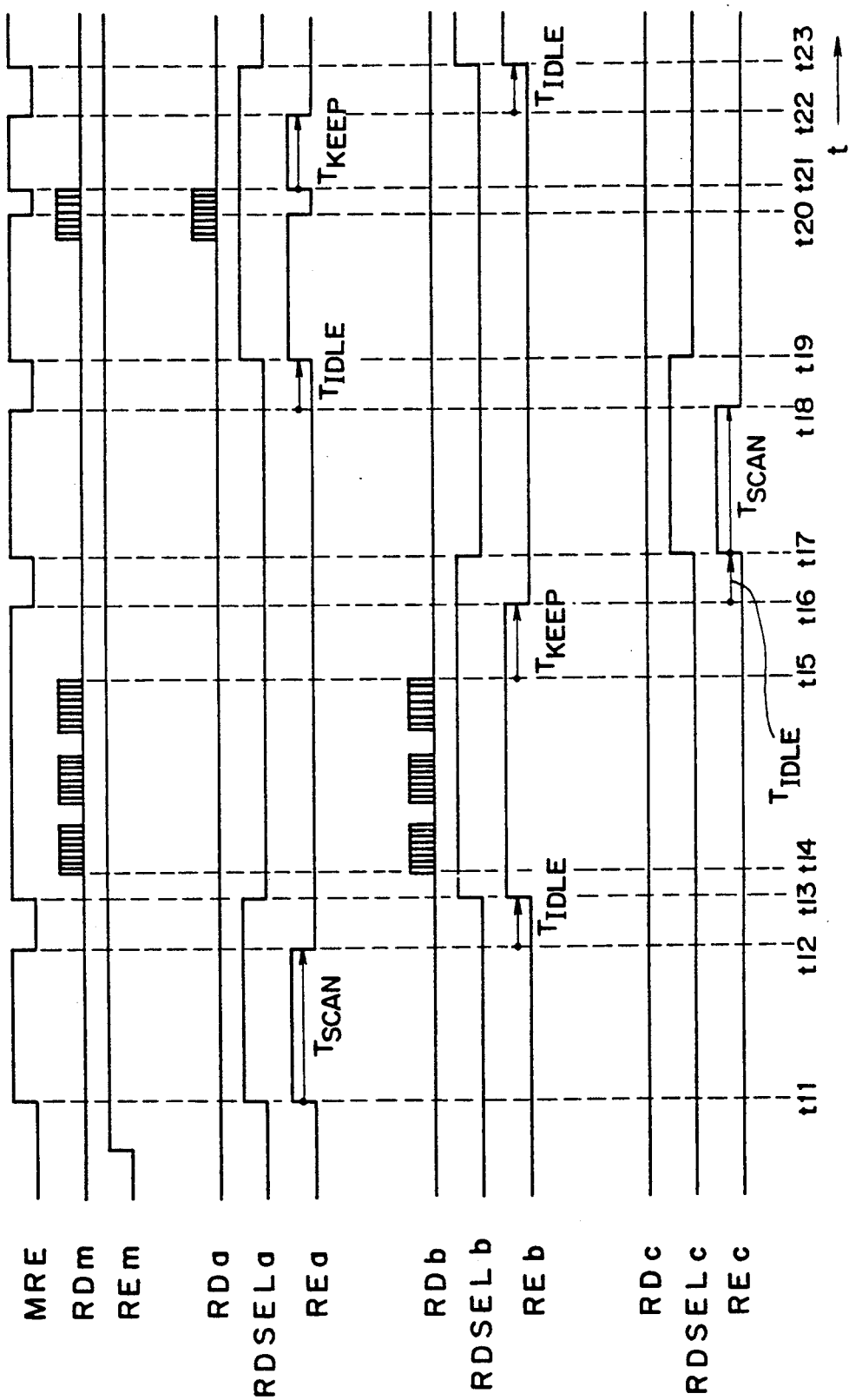
FIG. 12 is a timing chart showing an action of a file multiplex buffer shown in FIG. 1 when data transmitted from the data processing units to the file multiplex buffer.
Figure 14:
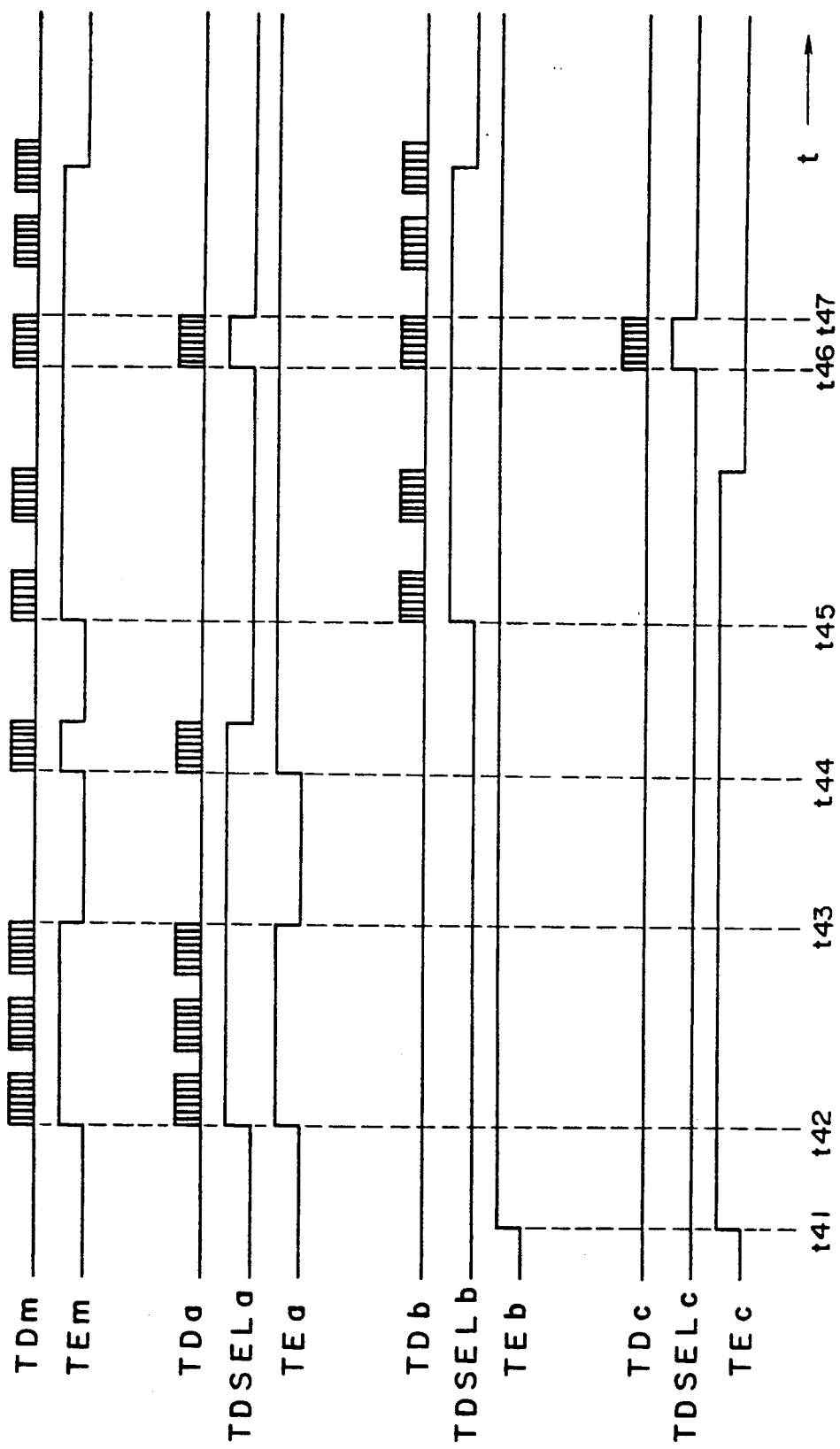
FIG. 14 is a timing chart showing an action of the file multiplex buffer when the file multiplex buffer transmits data to the data processing units.

FIGS. 12 and 14 are timing charts showing examples of a data reception operation of the data received from the DPUs 1A, 1B and 1C and a data transmission operation of the data transmitted to the printer system 10, which are described in detail later with reference thereto.

An action of the selector 214 will be described below briefly in the order of the following items with reference to FIGS. 7 to 9.

(c-3-1) Data reception operation from DPUs to FMB (c-3-2) Data transmission operation from FMB to DPUs (c-3-1) Data reception operation from DPUs to FMB In the case that the FMB 2 receives data transmitted from the DPUs 1A, 1B and 1C, one of the DPUs 1A, 1B and 1C is selected, and data transmitted from the selected one of the DPUs 1A, 1B and 1C are received by the FMB 2. Therefore, the CPU 211a of the MPU 211 outputs one of the turned on selection signals RDSELa, RDSELb and RDSELc in order to select one of the DPUs 1A, 1B and 1C.

As one example, when the DPU 1A is selected, the selection signal RDSELa is turned on. Furthermore, if the CPU 211a judges that there is an empty area in the RD buffer area of the RAM 212 so that the FMB 2 can receive data transmitted from the DPU 1A, the CPU 211a it turns on the selection signal REm, and further, it turns on the selection signal MRE for permitting or inhibiting the data reception operation by software as described above. When all the selection signals REm, RDSELa and MRE are turned on, the AND gate G12 are opened, and then, the reception enable signal REa having a high level is outputted to the DPU 1A through the level converter 215. Responsive to the reception enable signal REa, the DPU 1A transmits the data RDa to the FMB 2.

Since the selection signal RDSELa is turned on in the selector 214 as described above, the data RDa are outputted from the DPU 1A through the AND gate G4 to the OR gate G7, and further, they are outputted as the data RDm to the CCUA 211c through the bus B25. Thereafter, the CCUA 211c outputs the data RDm to the RD buffer area of the RAM 212 through the external bus interface 211e and the bus B21 so as to be stored therein, and then, the data reception operation is completed.

(c-3-2) Data transmission operation from FMB to DPUs

In the case that the FMB 2 transmits data to the DPUs 1A, 1B and 1C, it is necessary to select one or all of the DPUs 1A, 1B and 1C to which data stored in the RD buffer area of the RAM 212 are transmitted. Therefore, the CPU 211a of the MPU 211 turns on one or all of the selection signals TDSELa, TDSELb and TDSELc for selecting the DPUs 1A, 1B and 1C.

As one example, when the FMB 2 will transmit data to all the DPUs 1A, 1B and 1C, the CPU 211a turns on all the selection signals TDSELa, TDSELb and TDSELc, and the transmission data TDm stored in the TD buffer area of the RAM 212 are outputted to the selector 214 through the bus B21, the external bus interface 211e, CCUA 211c and the bus B25.

Since the selection signals TDSELa, TDSELb and TDSELc are turned on in the selector 214, the transmission data TDm are outputted as the transmission data TDa, TDb and TDc to the DPUs 1A, 1B and 1C through the AND gates G1 to G3, respectively, and then, the data transmission operation is completed.

In a normal state, when the transmission signal TEm is turned on, one of the DPUs 1A, 1B and 1C which is selected according to the selection signal RDSELa, RDSELb or RDSELc can receive data transmitted from the FMB 2. Therefore, the CPU 211a of the MPU 211 controls the CCUA 211c so as to transmit the transmission data TDm from the FMB 2 to the selected one of the DPUs 1A, 1B and 1C.

Furthermore, in the case that the FMB 2 transmits the transmission data TDm to all the DPUs 1A, 1B and 1C, the CPU 211a neglects the transmission enable signal TEm in spite of the turning on or off state thereof, and turns on all the selection signals TDSELa, TDSELb and TDSELc. Thereafter, the CCUA 211c transmits the transmission data TDm to the selector 214, and the transmission data TDm are transmitted as the transmission data TDa, TDb and TDc from the FMB 2 to all the DPUs 1A, 1B and 1C.

(d) Timing Chart of Data Reception Operation of FMB Upon Receiving Data from DPUs FIG. 12 is a timing chart of the data reception operation of the FMB 2 upon receiving data selecting data received from the DPUs 1A, 1B and 1C.

The data reception operation will be described below with reference to FIG. 12.

Referring to FIG. 12, first of all, when the selection signal MRE is turned on at a timing t11, the reception enable signal REa for permitting the DPU 1A to transmit data is turned on and is transmitted to the DPU 1A, and thereafter, the selection signal RDSELa is turned on so as to open the AND gate G4.

When the FMB 2 has not received any data from the DPU 1A for a predetermined time interval $T_{SCAN}$ since the timing t11, the selection signal MRE is turned off so as to turn the reception enable signal REa at a timing t12.

Thereafter, when the FMB 2 has not received any data from the DPU 1A for a predetermined time interval $T_{IDLE}$ since the timing t12, the selection signal RDSELa is turned off, the selection signal RDSELb is turned on, and the selection signal MRE is turned on at a timing t13 simultaneously, so as to turn on the reception enable signal REb for permitting the DPU 1B to transmit data.

Thereafter, when data transmitted from the DPU 1B are received at a timing t14 until the predetermined time interval $T_{SCAN}$ has passed since the timing t13, the selection signal REb is turned on continuously.

Since the data transmitted from the DPU 1B interrupt at a timing t15, a predetermined time interval $T_{KEEP}$ has passed at a timing t16, and then, the selection signal MRE is turned off. When the predetermined time interval $T_{IDLE}$ has passed since the timing t16, the selection signal RDSELb is turned off at a timing t17, and also the selection signal RDSELc is turned on so as to turn on the reception enable signal REc for permitting the DPU 1C to transmit data.

Similarly, when any data transmitted from the DPU 1C are not received by the FMB 2 for the predetermined time interval $T_{SCAN}$ from the timing t17 to a timing t18 and for the predetermined time interval $T_{IDLE}$ from the timing t18 to a timing t19, the selection signal RDSELc is turned off at the timing t19, and also the selection signal MRE is turned on for the DPU 1A, and the selection signal RDSELa is turned on so as to turn on the receipt enable signal REa for permitting the DPU 1A to transmit data.

It is to be noted that the time interval $T_{IDLE}$ is set at a time interval enough longer than a time required for transmitting data of one character. After the time interval $T_{SCAN}$ has passed, the selection signal MRE is turned off so as to turn off the reception enable signal REa. However, for example, when data transmitted from the DPU 1A are received for the time interval $T_{IDLE}$ at a timing t21, the selection signal RDSELa is turned on continuously, and the selection signal MRE is turned on so as to turn on the reception enable signal REa again at the timing t21, and then, the FMB 2 waits for data transmitted from the DPU 1A continuously. In this case, when any data transmitted from the DPU 1A have not received by the FMB 2 for the time interval $T_{KEEP}$ from the timing t21 to a timing t22, the selection signal MRE is turned off so as to turn off the reception signal REa at the timing t22.

Thereafter, when any data transmitted from the DPU 1A has not been received by the FMB 2 for the time interval $T_{IDLE}$ since the timing t22, the selection signal RDSELa is turned off at a timing t23, and also the RDSELb is turned on so as to turn on the reception enable signal REb for permitting the DPU 1B to transmit data.

After the data received by the CCUA 211c of the FMB 2 are stored in the RD buffer area of the RAM 212 thereof, they are outputted to the printer system 10. In order to represent a break between data transmitted from one DPU and data transmitted from another DPU when the DPUs to be selected are switched over from one DPU to another DPU, DPU code corresponding to another DPU is stored in the RAM 212.

In the above operation as described referring to FIG. 12, there is an empty area in the RD buffer area of the RAM 212, and data transmitted from the DPUs 1A, 1B and 1C can be always received.

However, in the case that there no empty area in the RD buffer area of the RAM 212 and data transmitted from the DPUs 1A, 1B and 1C can not be received by the FMB 2, only the reception enable signal REm is turned off (See step #60 of FIG. 17), and one of the selection signals RDSELa, RDSELb and RDSELc which has been turned on previously is turned on continuously independent of the time interval $T_{KEEP}$. Thereafter, when an empty area is caused in the RD buffer area of the RAM 212, the timer 211b is started to count a time again.

Furthermore, in the case that data transmitted from the printer system 10 and data transmitted from the DPUs 1A, 1B and 1C are not processed and remain in the RAM 212 of the FMB 2, the reception enable signal REm is turned on continuously since the above data are being processed.

Figure 13:
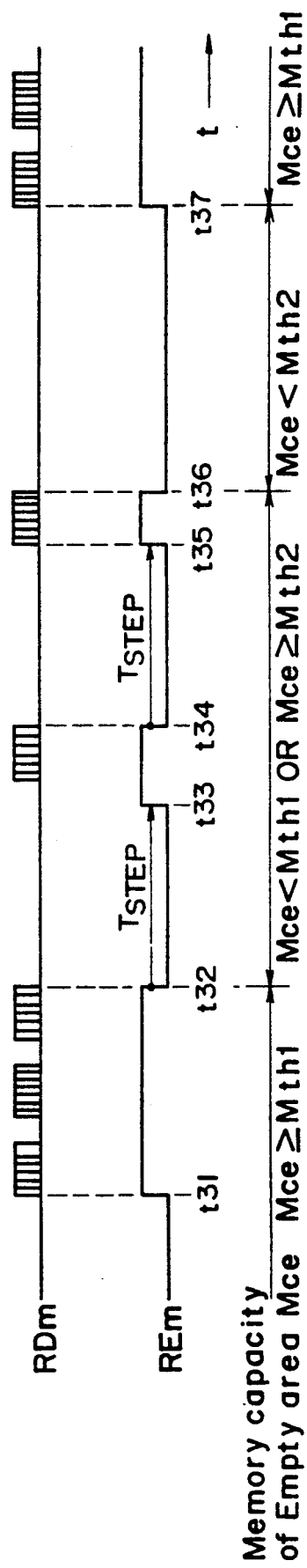
FIG. 13 is a timing chart showing a relationship between a memory capacity of an empty area in an RD buffer area of the RAM shown in FIG. 7 and a reception enable signal REm.

(e) Relationship Between Memory Capacity of Empty Area in RD Buffer Area of RAM of FMB and Reception Enable Signal RE FIG. 13 is a timing chart showing a relationship between a memory capacity Mce of the empty area in the RD buffer area of the RAM 212 and the reception enable signal REm.

Referring to FIG. 13, when the memory capacity Mce of the empty area is equal to or larger than a predetermined first threshold value Mth1, data transmitted from one of the DPUs 1A, 1B and 1C are received by the FMB 2 continuously for a timing interval from a timing t31 to a timing t32.

When the memory capacity Mce of the empty area becomes smaller than the above threshold value Mth1, the reception enable signal REm is turned off so as to inhibit the DPUs 1A, 1B and 1C from transmitting data at a timing t32. However, in the case that the memory capacity Mce of the empty area is smaller than the first threshold value Mth1 and equal to or larger than a predetermined second threshold value Mth2 which is smaller than the first threshold value Mth1, when a predetermined time interval $T_{STEP}$ has passed since the timing t32, the reception enable signal REm is turned on once at a timing t33. Thereafter, data of one character are taken in the RD buffer area of the RAM 212, and then, the reception enable signal REm is turned off again at a timing t34 so as to inhibit the DPUs 1A, 1B and 1C from transmitting data.

Thereafter, similarly, when the predetermined time interval $T_{STEP}$ has passed since the timing t34, the reception enable signal REm is turned on once at a timing t35. Thereafter, data of one character are taken in the RD buffer area of the RAM 212, and then, the reception enable signal REm is turned off again at a timing t36 so as to inhibit the DPUs 1A, 1B and 1C from transmitting data.

The above operations for a time interval from the timing t32 to the timing t34 and for a time interval from the timing t34 to the timing t36 are executed in order to receive data transmitted from the DPUs 1A, 1B and 1C, without completely inhibit the DPUs 1A, 1B and 1C from transmitting data, although the reception speed of the FMB 2 becomes relatively low.

However, when the memory capacity Mce of the empty area in the RD buffer area of the RAM 212 becomes smaller than the above second threshold value Mth2 for a time interval from the timing t36 to a timing t37, data transmitted from the DPUs 1A, 1B and 1C are not received at all.

In the preferred embodiment, for example, a time interval between the adjacent two data transmitted from one of the DPUs 1A, 1B and 1C upon receiving data continuously is set at a value of 120 μmsec., the first threshold value Mth1 is set at 512 bits, the second threshold value Mth2 is set at 128 bits, and the above time interval $T_{STEP}$ is set at 5 sec. In this case, when data transmitted from the DPUs 1A, 1B and 1C are received continuously for a time interval of 38.4 msec. until the memory capacity Mce of the empty area becomes the second threshold value Mth2 after becoming the first threshold value Mth1, any data transmitted from the DPUs 1A, 1B and 1C can not be received at all. However, when data transmitted from one of the DPUs 1A, 1B and 1C are received at the time intervals $T_{STEP}$ of 5 sec., the data can be received for a maximum time interval of 32 minutes. It is to be noted that data transmitted from one of the DPUs 1A, 1B and 1C are received at a predetermined time interval of 100 μsec. until the memory capacity Mce of the empty area in the RD buffer area of the RAM 212 becomes the first threshold value Mth1.

When a trouble arises in the printer system 10, the data receipt operation is interrupted without performing the above operations depending on the memory capacity Mce of the empty area in the RD buffer area of the RAM 212.

(f) Timing Upon Transmitting Data From FM to DPUs

FIG. 14 is a timing chart showing a data transmission operation upon transmitting data from the FMB 2 to respective DPUs 1A, 1B and 1C.

When at least one of the transmission enable signals TEa, TEb and TEc for respectively indicating whether or not the DPUs 1A, 1B and 1C can receive data is turned on, the FMB 2 can transmit data to the DPU corresponding to the turned on transmission enable signal TEa, TEb or TEc. It is to be noted that, when there is no data in the DPUs 1A, 1B and 1C to be transmitted to the FMB 2, any data is not transmitted from the DPUs 1A, 1B and 1C to the FMB 2.

Referring to FIG. 14, normally, after the DPUs 1A, 1B and 1C are turned on and predetermined initialization is performed, the transmission enable signals TEa, TEb and TEc are turned on at a timing t41 or t42 and are transmitted from the DPUs 1A, 1B and 1C to the FMB 2. In this case, when there are data stored in the RD buffer area of the RAM 212 to be transmitted to the DPUs 1A, 1B and 1C, the selection signal, for example, TDSELa corresponding to the DPU 1A to which the above data are to be transmitted is turned on so as to open the AND gate G1 at the timing t42, and then, the transmission data TDm are transmitted as transmission data TDa from the MPU 211 through the selector 214 to the DPU 1A.

If the DPU 1A can not receive data transmitted from the FMB 2 temporarily while the FMB 2 transmits the above transmission data TDa to the DPU 1A, the DPU 1A turns off the transmission enable signal TEa so as to turn off the transmission enable signal TEm at a timing t43, and then, the data transmission operation executed by the CCUA 211c of the MPU 211 is interrupted. Thereafter, when the transmission enable signal TEa is turned on at a timing t44 so as to turn on the transmission enable signal TEm, the FMB 2 starts to transmit data stored in the RD buffer area of the RAM 212 to the DPU 1A.

Thereafter, when another selection signal TDSELb for permitting another DPU 1B to transmit data is turned on, data stored in the RD buffer area of the RAM 212 are transmitted to the DPU 1B at a timing t45.

In order to transmit data to all the DPUs 1A, 1B and 1C simultaneously, all the selection signals TDSELa, TDSELb and TDSELc are turned on at a timing t46, and then, the transmission data TDm are transmitted as the transmission data TDa, TDb and TDc from the FMB 2 to all the DPUs 1A, 1B and 1C, respectively.

Figure 11A:
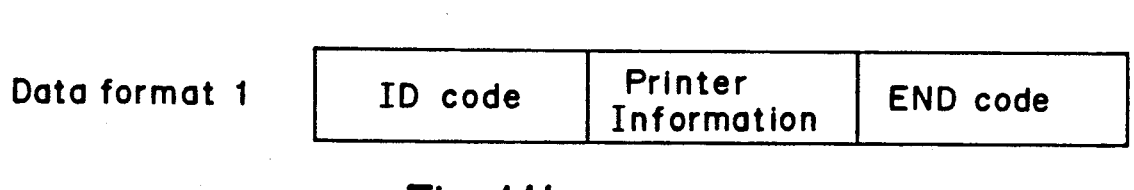
FIGS. 11a and 11b are diagrams showing data formats of data transmitted from the printer system to the data processing units shown in FIG. 1.
Figure 11B:

FIGS. 11a and 11b show data formats of the data which are transmitted from the printer system 10 through the FMB 2 to the DPUs 1A, 1B and 1C.

As shown in FIGS. 11a and 11b, the data transmitted from the printer system 10 through the FMB 2 to the DPUs 1A, 1B and 1C have two kinds of data formats 1 and 2.

The data having a data format 1 are composed of an ID code for indicating the DPUs 1A, 1B and 1C, a printer information for representing a status information of the printer system 10, and an END code for representing the end of the data. In the case that the data are transmitted to plural DPUs, after the END code is transmitted thereto, a return operation is performed at a timing t47 as shown in FIG. 14. Furthermore, in the case that the DPUs 1A, 1B and 1C and the printer system 10 operate synchronously with each other, there may be used data having a data format 2 without the ID code.

In the preferred embodiment, data to be transmitted to respective DPUs 1A, 1B and 1C are determined as follows.

The data transmitted from the printer system 10 through the FMB 2 to the DPUs 1A, 1B and 1C mainly comprises response signals for commands transmitted from the DPUs 1A, 1B and 1C through the FMB 2 to the printer system 10. Therefore, normally, when one of the selection signals TDSELa, TDSELb and TDSELc for designating one of the DPUs 1A, 1B and 1C to which the transmission data TDm are to be transmitted is turned on, one of the selection signals RDSELa, RDSELb and RDSELc corresponding thereto is turned on accompanying therewith.

However, when the ID code for specifying one or all of the DPUs 1A, 1B and 1C is added to data to be transmitted from the printer system 10, one or all of the selection signals TDSELa, TDSELb and TDSELc corresponding to the ID code thereof are turned on temporarily in order to transmit data to the DPUs corresponding to the ID code.

Furthermore, in the case of a normal transmission operation, when all the transmission enable signals TEa, TEb and TEc are turned off, the FMB 2 becomes a transmission waiting state for waiting to transmit data. However, in the case that data are transmitted to all the DPUs 1A, 1B and 1C, when the transmission enable signals transmitted from the DPUs other than the DPU which has been designated finally are turned off, the transmission enable signals are neglected since the DPUs themselves may not be used, and then, data are transmitted to all the DPUs 1A, 1B and 1C at a timing t46 of FIG. 14.

(g) Control Flow of MPU

FIGS. 15 to 21, 22a and 22b are flowcharts showing the system program stored in the ROM 213 which is executed by the MPU 211 of the FMB 2 shown in FIGS. 7 and 8.

An action of the FMB 2 will be described below in the order of the following items with reference to the flowcharts shown in FIGS. 15 to 21, 22a and 22b.

(g-1) Parameters and Flags used in System program
(g-2) Main routine
(g-3) DPU scan control process
(g-4) CCUA reception interruption process (g-5) CCUB transmission process
(g-6) CCUB transmission interruption process
(g-7) Printer status process
(g-8) CCUB reception interruption process
(g-9) Timer interruption process (g-1) Parameters and Flags used in System program Parameters, flags, timers and a register used in the system program are as follows:

(1) CRDPU: a parameter representing the DPUs 1A, 1B and 1C whose reception data lines are connected at present to the reception data line for transmitting the reception data RDm of the bus B26.

(2) CTDPU: a parameter representing the DPUs 1A, 1B and 1C whose transmission data lines are connected at present to the transmission data line for transmitting the transmission data TDm of the bus B26.

(3) SCSTAT: a parameter representing a state of a reception control operation for controlling the data reception operation of data received from the DPUs 1A, 1B and 1C,
wherein
   SCSTAT=0 represents a non-control state,
   SCSTAT=1 represents a waiting state for waiting a head data upon scanning the DPUs 1A, 1B and 1C, and
   SCSTAT=2 represents a switching state for switching the signal lines which are connected to the DPUs 1A, 1B and 1C.

(4) LKDPU: a flag representing a state in which at least one data has been received from one of the DPUs 1A, 1B and 1C which is connected to the printer system 10.

(5) DRDPU: a flag to be set every time data are received from one of the DPUs 1A, 1B and 1C.

(6) DRTMR: a timer for controlling the reception operation for receiving data transmitted from the DPUs 1A, 1B and 1C.

(7) DTTMR: a timer for controlling the transmission operation for transmitting data to one of the DPUs 1A, 1B and 1C.

(8) RITMR: a timer for controlling a reception time interval between adjacent data transmitted from one of the DPUs 1A, 1B and 1C.

(9) CCUTB1: a flag representing a state in which the CCUA 211c transmits data to the DPUs 1A, 1B and 1C.

(10) CCUTB2: a flag representing a state in which the CCUB 211d transmits data to the printer system 10.

(11) ENBID: a flag representing a state in which the FMB 2 specifies the ID of each DPU for the printer system 10.

(12) TMPREG: a temporary storage register for temporarily storing printer status information of the printer system 10.

(13) ERROR: a flag representing a state in which an error occurs in the printer system 10.

(g-2) Main Routine

Figure 15:
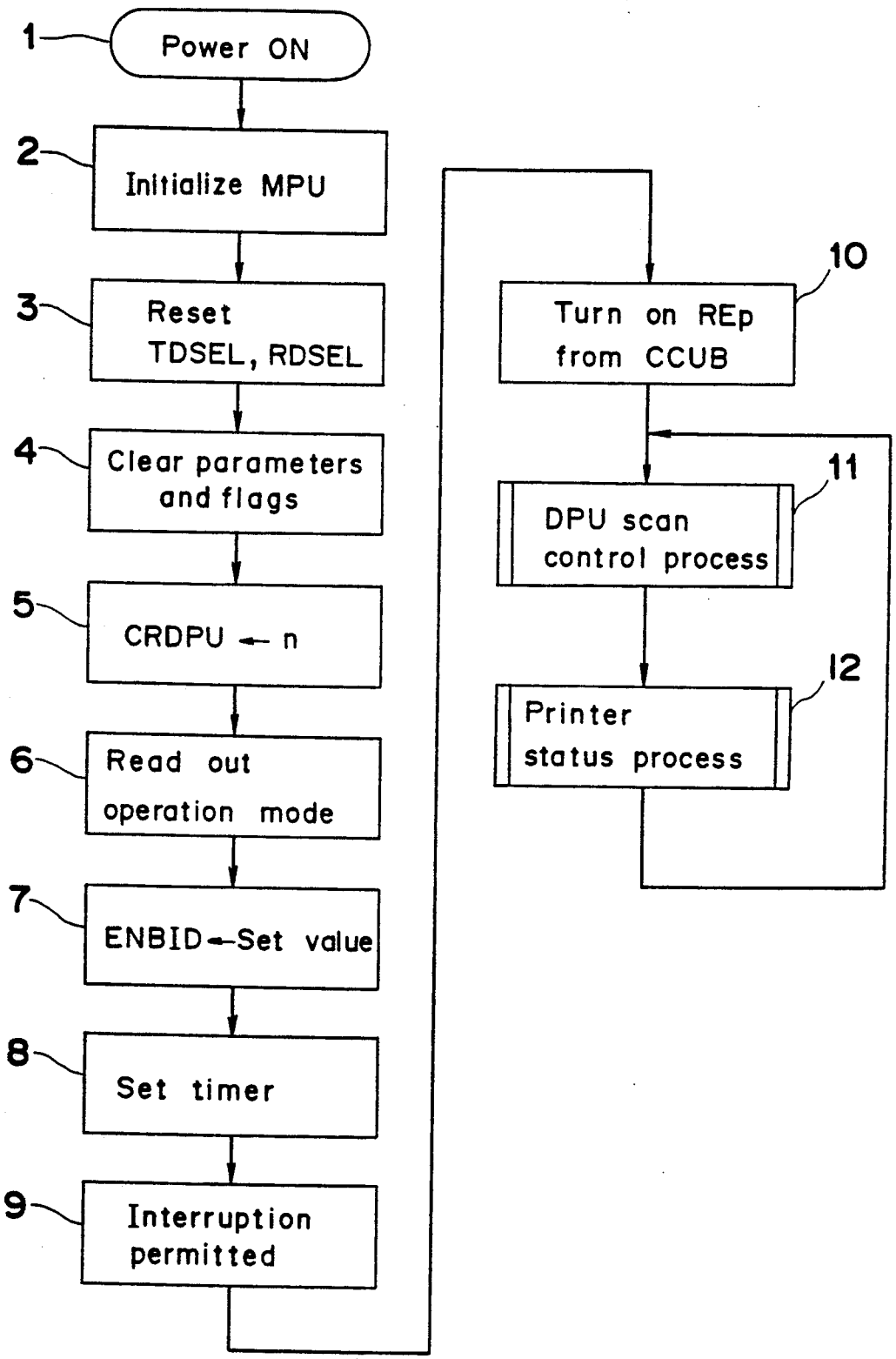
FIG. 15 is a flowchart showing a main routine executed by the microprocessing unit of the file multiplex buffer shown in FIG. 7.

FIG. 15 shows a main routine which is executed by the MPU 211 of the FMB 2.

Referring to FIG. 15, the main routine is composed of an initialization process of steps #1 to #10, and a loop process of steps #11 and #12.

First of all, the FMB 2 is turned on at step #1, and then, the MPU 211 performs an initialization process at step #2. Thereafter, there are reset the selection signals TDSELa, TDSELb and TDSELc (referred to as selection signals TDSEL generically hereinafter) and the selection signals RDSELa, RDSELb and RDSELc (referred to as selection signals RDSEL generically hereinafter), and then, the above-described parameters and flags are reset to zero at step #4.

Thereafter, the parameter CRDPU of a head code of the DPUs 1A, 1B and 1C to be scanned is set at a predetermined natural number "n" at step #5, and then, the operation mode which is set using the switches 218 is read out at step #6. Thereafter, the parameter ENBID for representing whether or not the transmitted ID code of the DPUs 1A, 1B and 1C is to be transmitted to the printer system 10 is set at a set value at step #7, and then, there are set a timer in order to start a timer interruption routine shown in FIGS. 22a and 22b at a predetermined time period at step #8. Thereafter, all the interruptions are permitted at step #9, and then, there is turned on the reception enable signal REp for indicating that the FMB 2 can receive data transmitted from the printer system 10 at step #10.

Figure 16A:
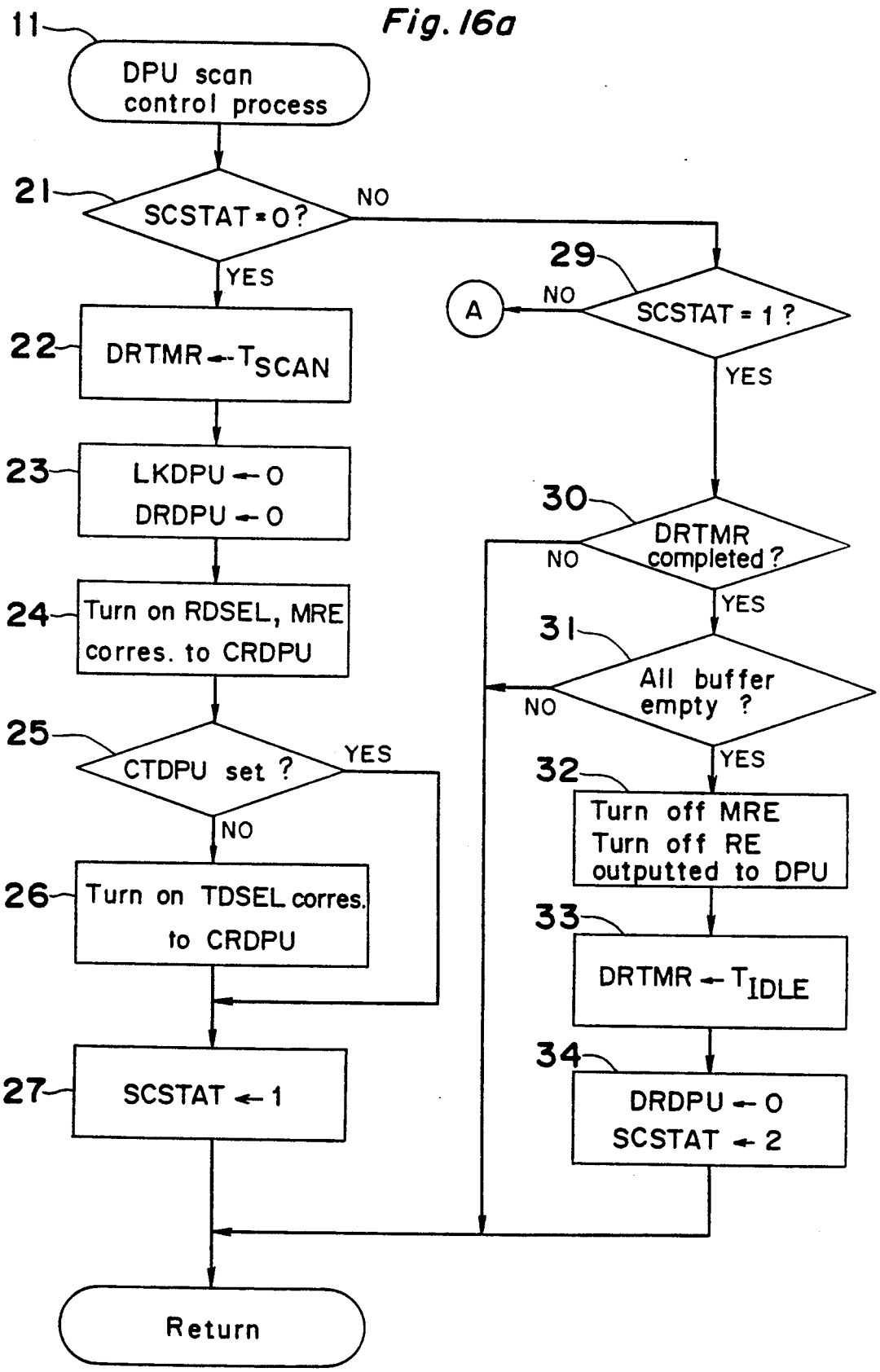
FIGS. 16a and 16b are flowcharts showing a DPU scan control process shown in FIG. 15.
Figure 16B:
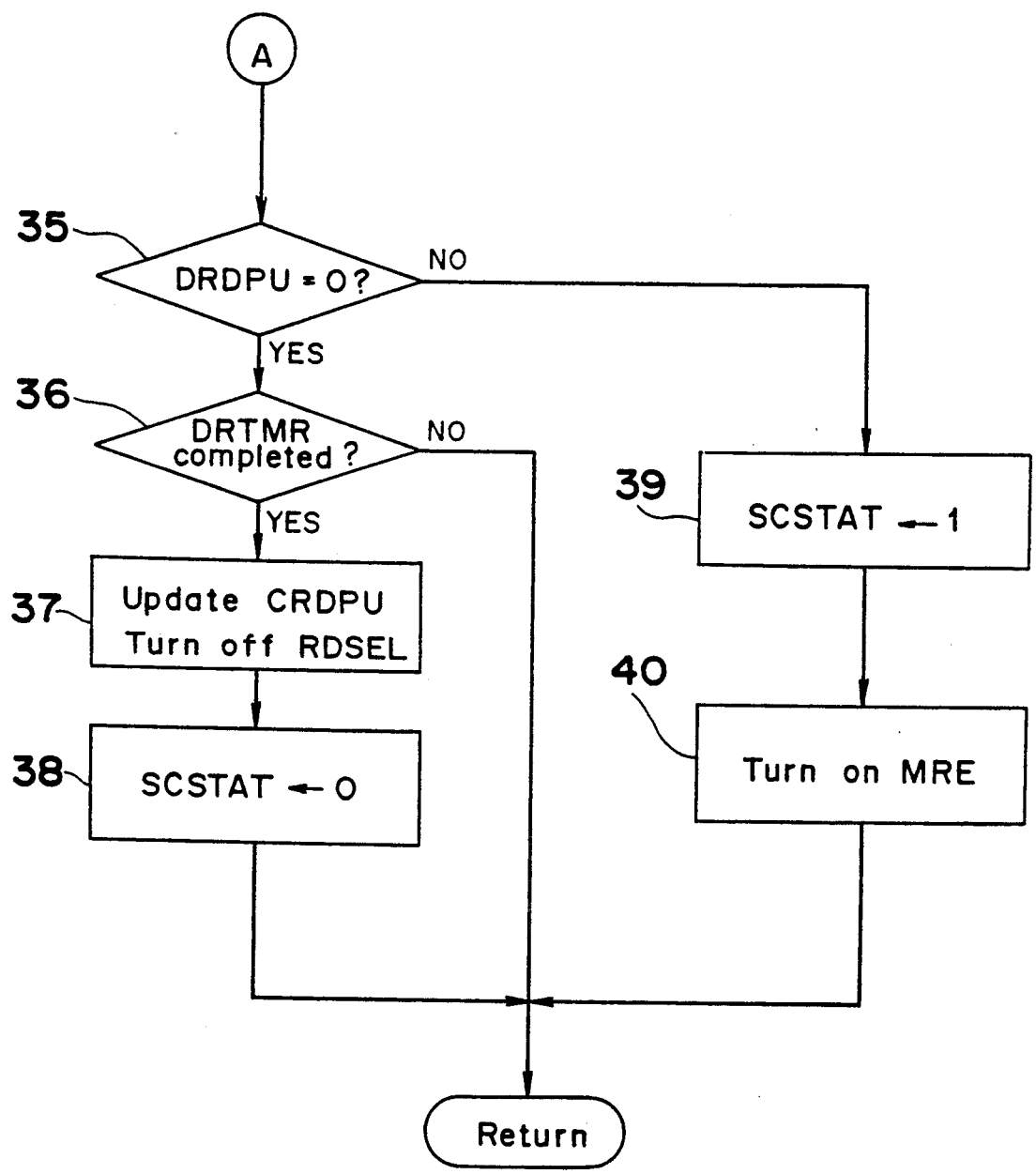
Figure 20A:
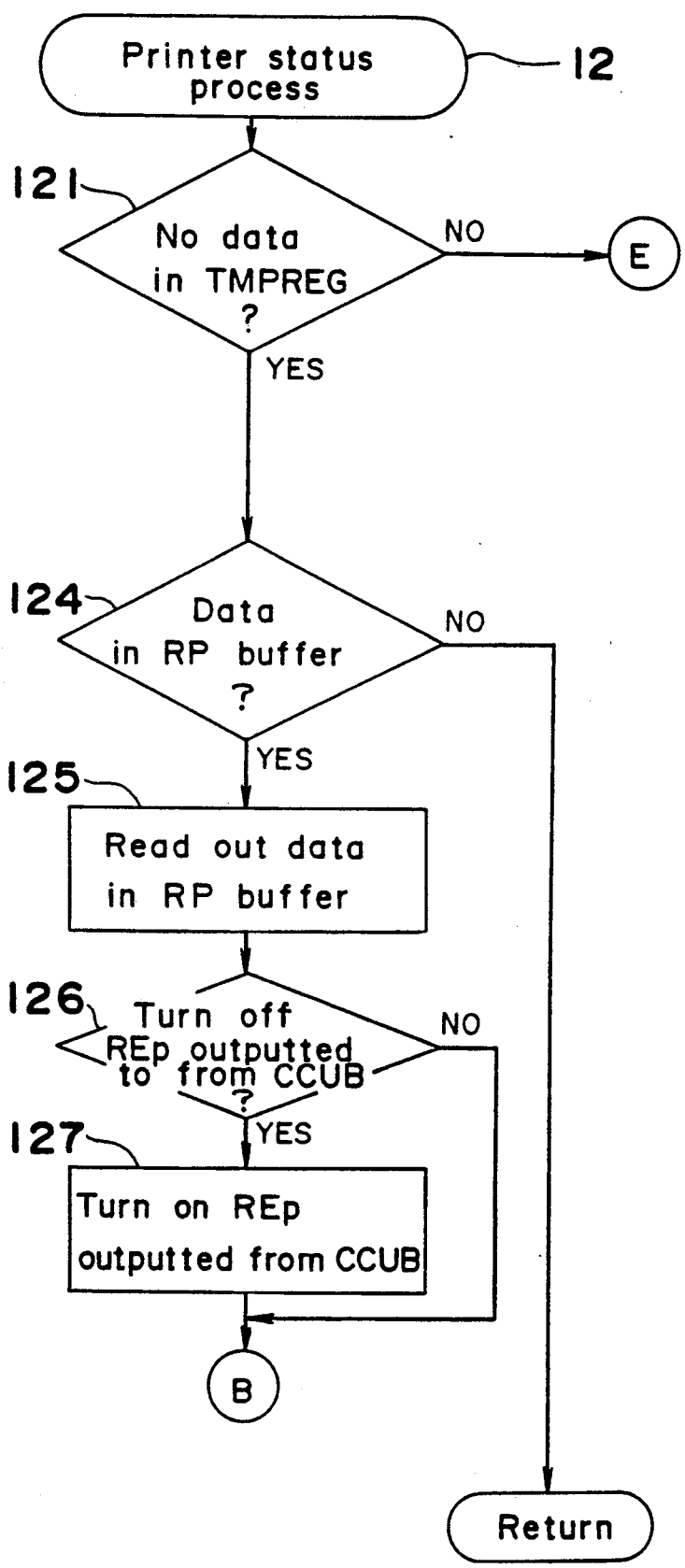
FIGS. 20a, 20b and 20c are flowcharts showing a printer status process which is executed by the microprocessing unit shown in FIG. 7.
Figure 20B:
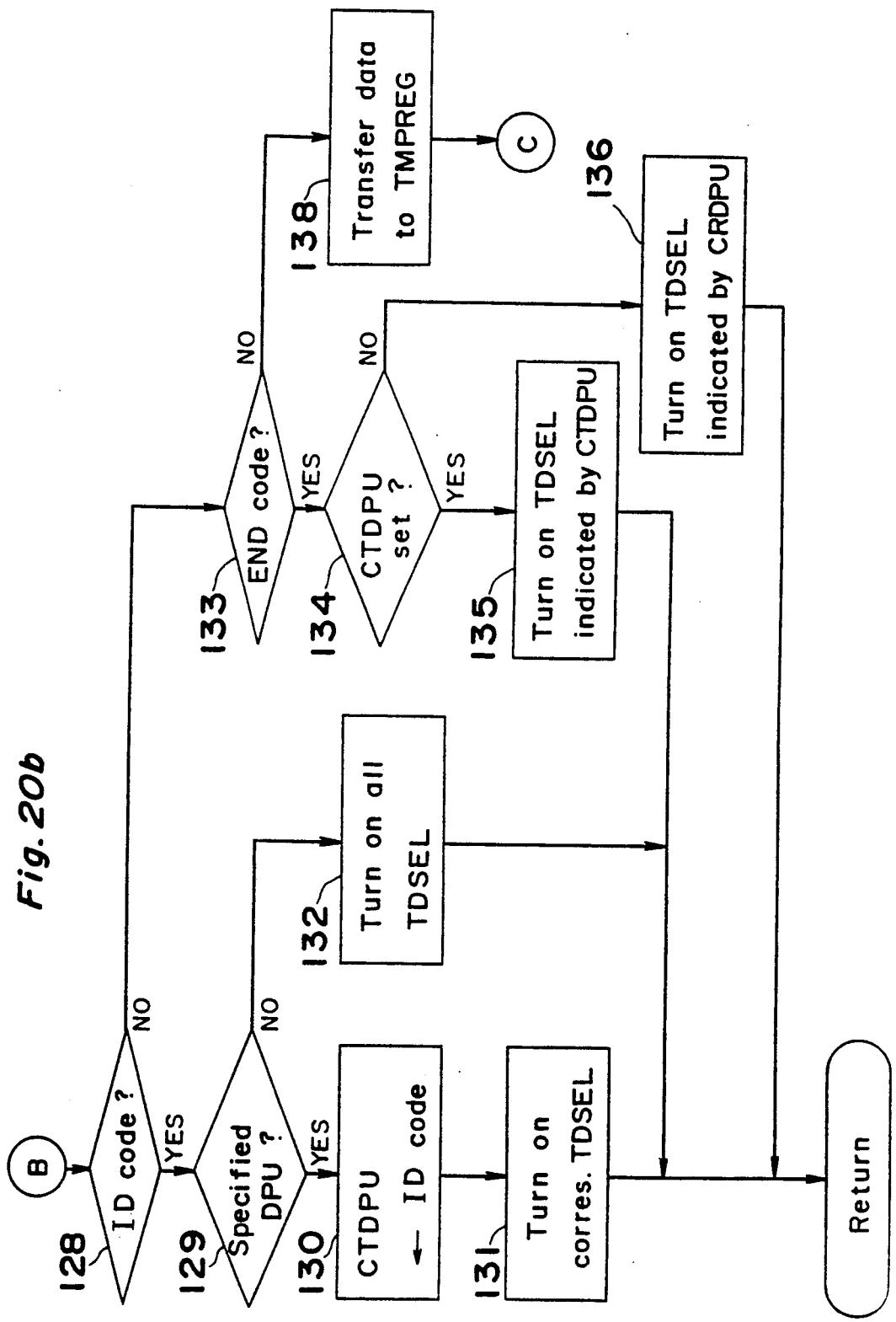
Figure 20C:
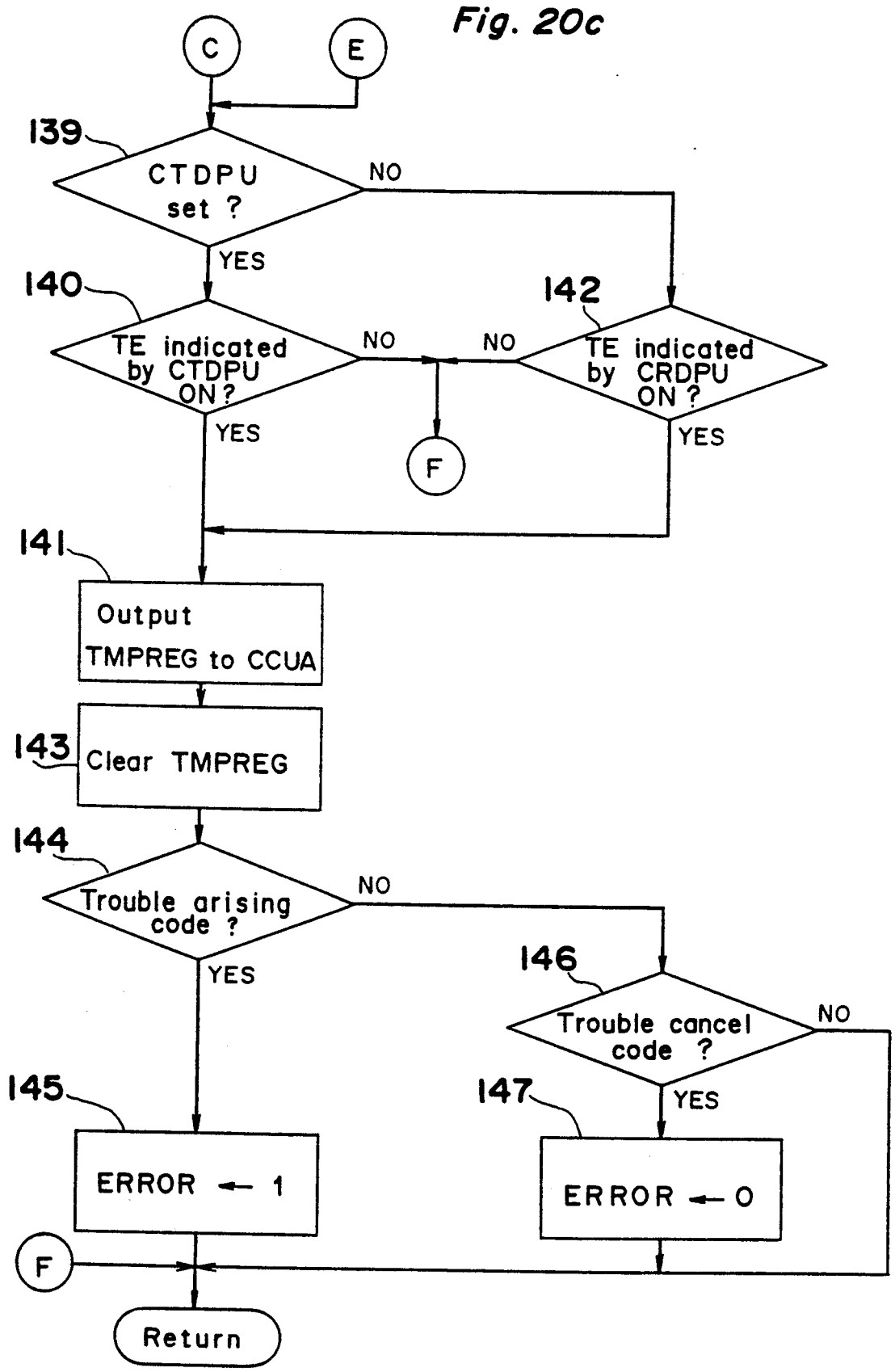

In the loop process following step #10, there is executed a DPU scan control process shown in FIGS. 16a and 16b for executing a scan process for the DPUs 1A, 1B and 1C depending on a data reception state at step #11, and then, there is executed a printer status process shown in FIGS. 20a to 20c for selecting the DPUs 1A, 1B and 1C responsive to data transmitted from the printer system 10. Thereafter, the program flow goes back to step #11, the loop process of steps #11 and #12 is repeated.

Figure 17:
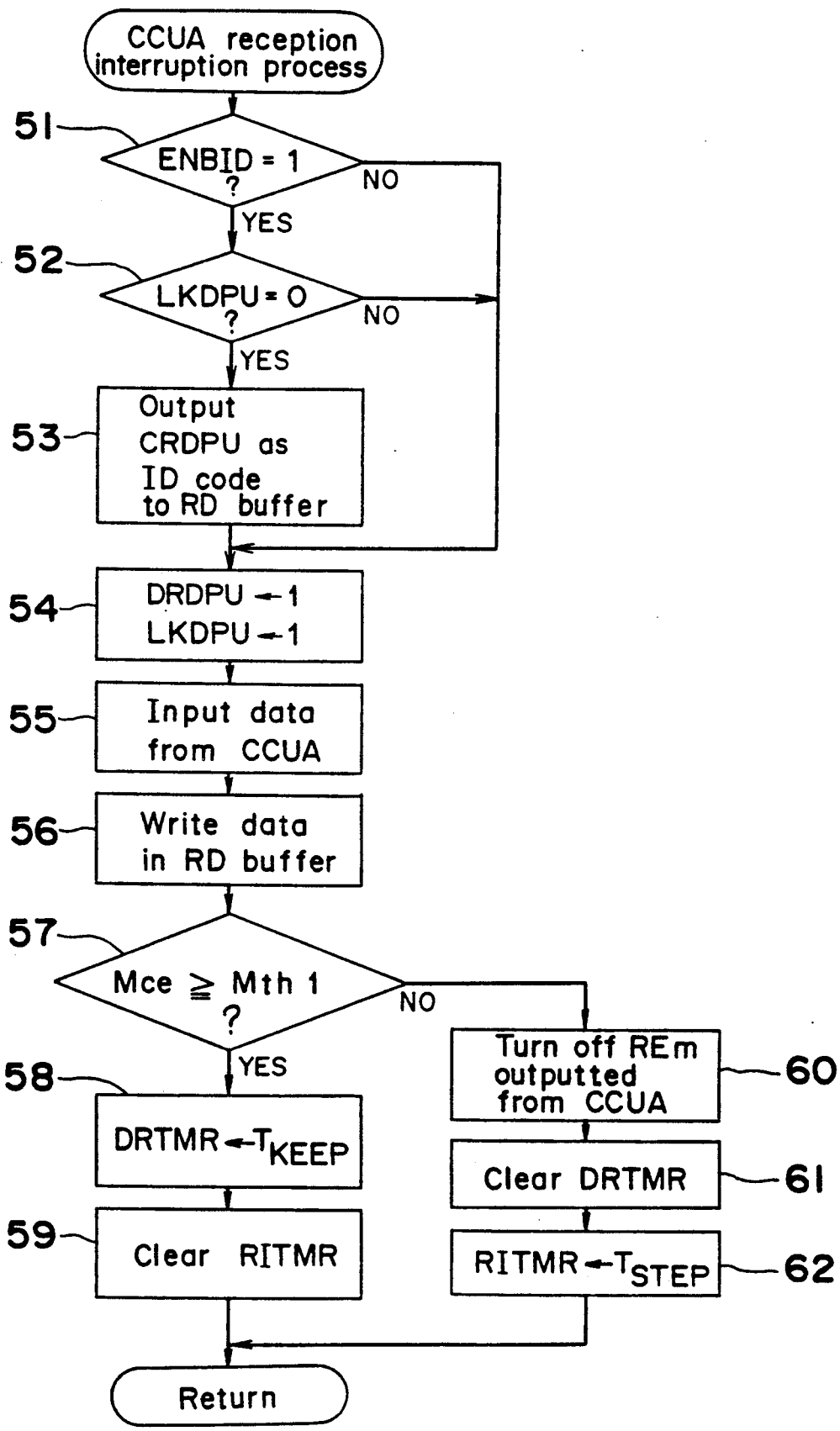
FIG. 17 is a flowchart showing a CCUA reception interruption process which is executed by the microprocessing unit shown in FIG. 7.
Figure 19:
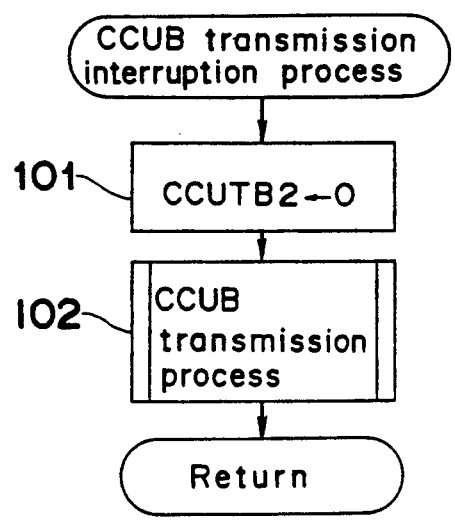
FIG. 19 is a flowchart showing a CCUB transmission interruption process which is executed by the microprocessing unit shown in FIG. 7.
Figure 21:
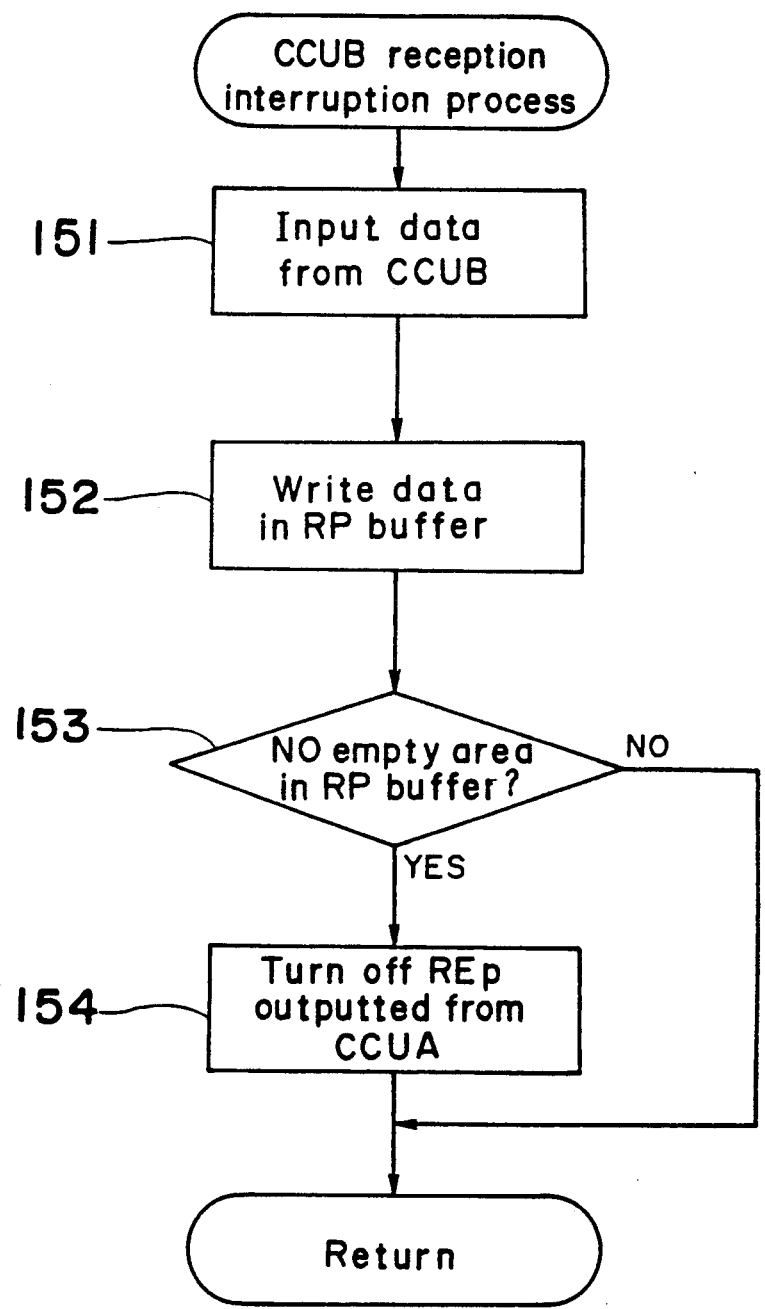
FIG. 21 is a flowchart showing a CCUB reception interruption process which is executed by the microprocessing unit shown in FIG. 7.
Figure 22A:
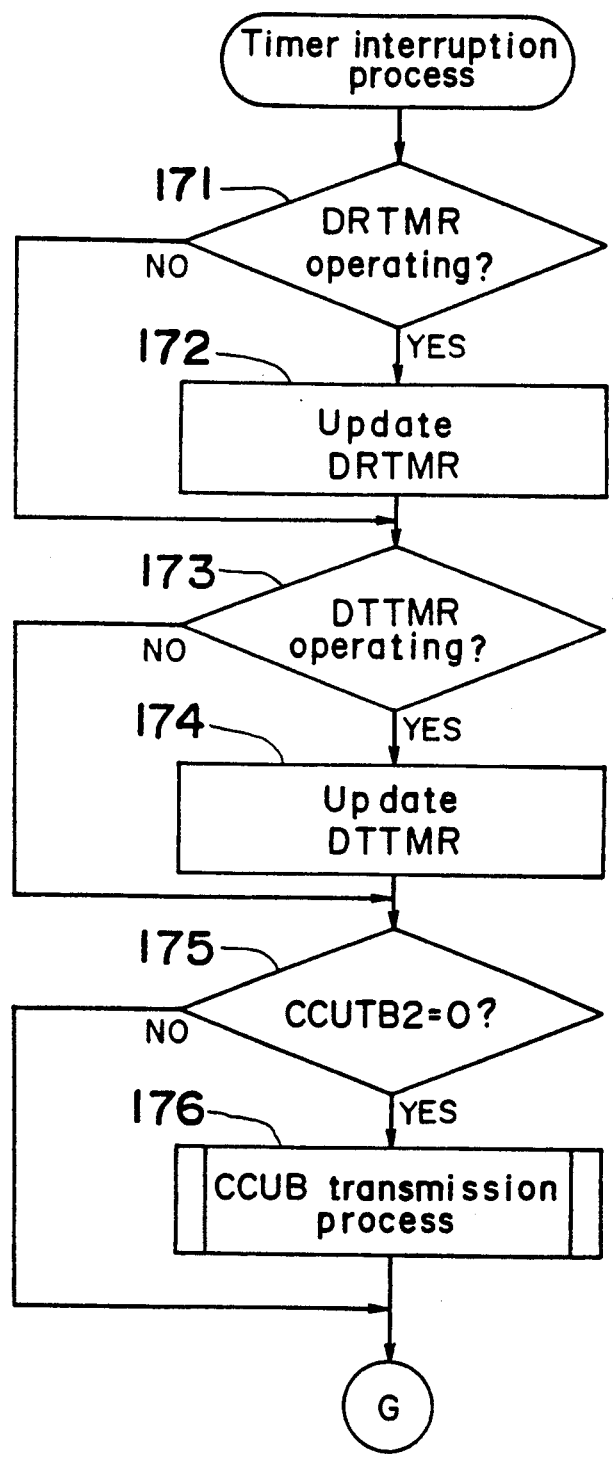
FIGS. 22a and 22b are flowcharts showing a timer interruption process which is executed by the microprocessing unit shown in FIG. 7.
Figure 22B:
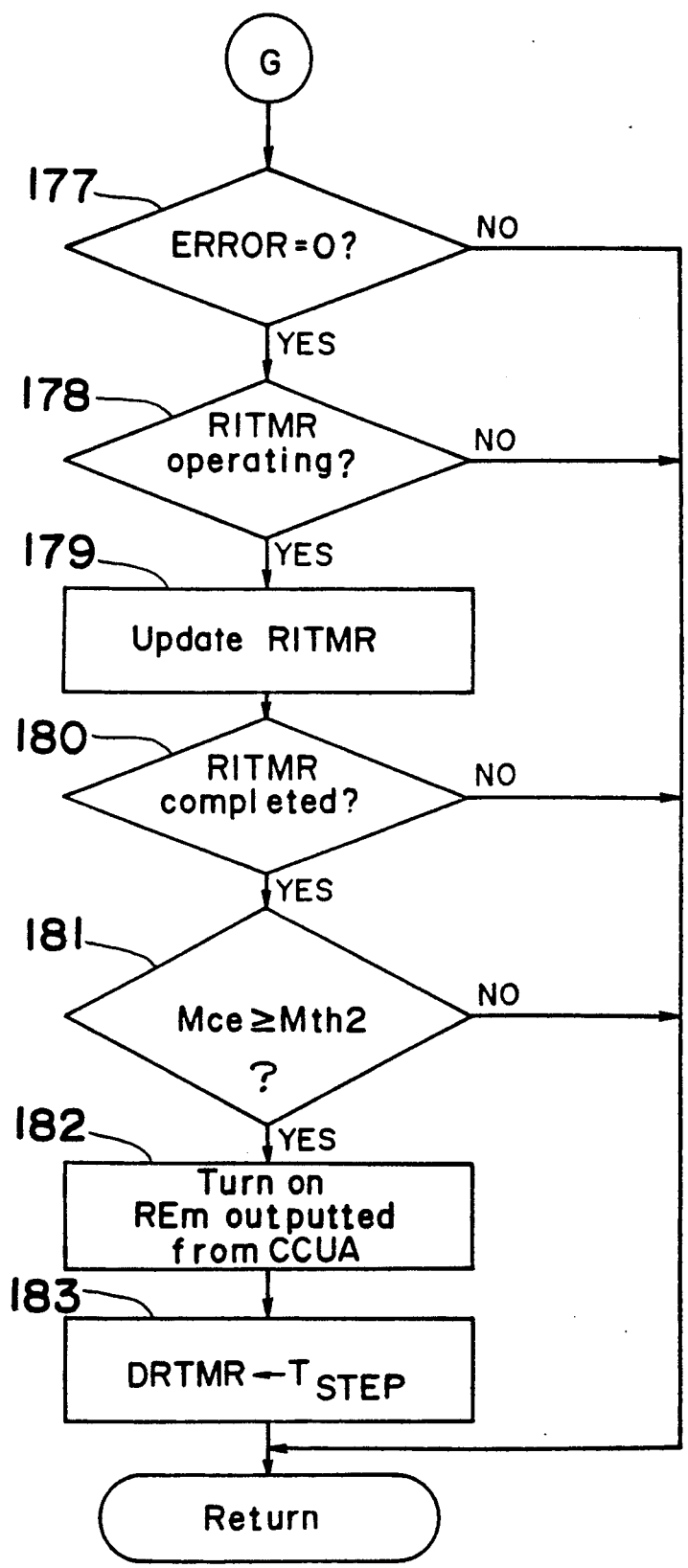

It is to be noted that the practical data input and output operations are executed in a CCUA reception interruption process shown in FIG. 17, a CCUB transmission interruption process shown in FIG. 19, a CCUB reception interruption process shown in FIG. 21, and a timer interruption process shown in FIGS. 22a and 22b.

The processes shown in FIGS. 16a, 16b, 17 to 19, 20a to 20c, 21, 22a and 22b are described below with reference to the timing charts shown in FIGS. 12 to 14.

(g-3) DPU Scan Control Process

FIGS. 16a and 16b show the DPU scan control processes (step #11) shown in FIG. 15.

Referring to FIG. 16a, it is judged whether or not the parameter SCSTAT is set at zero at step #21. If the parameter SCSTAT is set at zero (Yes at step #21), the program flow goes to step #22. On the other hand, if the parameter SCSTAT is not set at zero (No at step #21), the program flow goes to step #29.

In the case that the FMB 2 is turned on, the parameter SCSTAT is set at zero. Therefore, the program flow goes to step #22, and then, the timer DRTMR is set at the predetermined time interval $T_{SCAN}$. Thereafter, after the flags LKDPU and DRDPU are reset to zero at step #23, there are turned on the selection signal RDSEL corresponding to the parameter CRDPU and the selection signal MRE at step #24 as shown at the timings t11 and t17 of FIG. 12, and then, the FMB 2 becomes a data waiting state for waiting to receive data transmitted from the DPUs 1A, 1B and 1C. Thereafter, it is judged whether or not the parameter CTDPU has been set at step #25.

If the DPUs 1A, 1B and 1C to which data are to be transmitted are not specified (No at step #25), there is turned on only the selection signal TDSEL corresponding to the parameter CRDPU at step #26 in order to designate the same DPU as the DPU which has been designated finally, and then, the program flow goes to step #27. On the other hand, if the DPUs 1A, 1B and 1C to which data are to be transmitted are specified (Yes at step #25), the program flow goes to step #27, directly.

At step #27, the parameter SCSTAT is set at one so as to set the FMB 2 in the data waiting state upon scanning the DPUs 1A, 1B and 1C, and then, the program flow returns.

The data reception operation is executed in the CCUA reception interruption process shown in FIG. 17, and when data transmitted from one of the DPUs 1A, 1B and 1C are not received for the predetermined time interval $T_{SCAN}$, namely, the data reception interruption process is not executed, the timer DRTMR counts up to the time $T_{SCAN}$. Furthermore, in the case that there is enough memory capacity of the empty area in the RD buffer area of the RAM 212, the timer DRTMR is set at the predetermined time $T_{KEEP}$ every time the data transmitted from one of the DPUs 1A, 1B and 1C are received, and the reception interruption process is executed.

At step #29, it is judged whether or not the parameter SCSTAT is set at one. If the parameter SCSTAT is set at one (Yes at step #29), the program flow goes to step #30. On the other hand, if the parameter SCSTAT is not set at one (No at step #29), the program flow goes to step #35.

When the scan operation for the DPUs 1A, 1B and 1C is started and the FMB 2 waits for the head data, namely, the parameter SCSTAT is set at one (Yes at step #29), it is judged whether or not the timer DRTMR counts up to the preset time at step #30, and then, it is judged whether or not all the buffer memories are empty at step #31.

If the timer DRTMR counts up to the preset time (Yes at step #30) and all the buffer memories are empty (Yes at step #31), the selection signal MRE is turned off, and one of the reception enable signals REa, REb and REc (referred to as a reception enable signal RE generically hereinafter) corresponding the parameter DRDPU are turned off at step #32 as shown at the timings t12 and t18 of FIG. 14, and then, the timer DRTMR is set at the predetermined time $T_{IDLE}$ at step #33. Thereafter, in order to prepare to switch over the DPUs 1A, 1B and 1C, the parameter DRDPU is reset to zero, and also the parameter SCSTAT is set at two at step #34, and then, the program returns. On the other hand, if the timer DRTMR has not counted up to the preset time yet (No at step #30) or if all the buffer memories are not empty (No at step #31), the program flow returns directly.

At step #35, it is judged whether or not the data reception operation has not executed yet upon preparing to switch over the DPUs 1A, 1B and 1C, namely, the parameter DRDPU is set at zero. If the parameter DRDPU is set at zero (Yes at step #35), it is judged whether or not the timer DRTMR has counted up to the preset time at step #36. Then, if the timer DRTMR has not counted up to the preset time (No at step #36), the program flow returns directly. On the other hand, the timer DRTMR has counted up to the preset time (Yes at step #36) as shown at the timing t13 of FIG. 12, and then, in order to switch over the DPUs 1A, 1B and 1C, the parameter CRDPU is updated, and the selection signal RDSEL which has been turned on up to the present is turned off at step #37 as shown at the timing t13 of FIG. 12. Thereafter, the parameter SCSTAT is set at zero so as to set the FMB 2 in the data non-control state at step #38, and then, the program returns.

On the other hand, if the data transmitted from one of the DPUs 1A, 1B and 1C are received even though the FMB 2 prepares to switch over the DPUs 1A, 1B and 1C, namely, the parameter DRDPU is not set at zero (No at step #35) as shown at the timings t20 and t21 of FIG. 12, the parameter SCSTAT is set at one so as to stop preparing to switch over the DPUs 1A, 1B and 1C at step #39, and then, the selection signal MRE is turned on so as to turn on the reception enable signal RE corresponding to the DRDPU again at step #40. Thereafter, the program flow returns, and then, the processes from step #29 are executed.

(g-4) CCUA Reception Interruption Process

FIG. 17 shows the CCUA reception interruption process which is started when the CCUA 211c receives data transmitted from one of the DPUs 1A, 1B and 1C.

Referring to FIG. 17, first of all, it is judged whether or not the flag ENBID is set at one at step #51, wherein the flag ENBID represents that there is specified the ID every DPUs for the printer system 10 in order to indicate one of the DPUs 1A, 1B and 1C from which data are to be received, and it is judged whether or not the flag LKDPU is set at zero at step #52.

If the flag ENBID is set at one (Yes at step #51), and the flag LKDPU is set at zero, namely, any data have not received yet from the DPU corresponding to the parameter CRDPU (Yes at step #52), the parameter CRDPU representing the DPU whose data reception line is connected to the RD buffer area of the RAM 212 at present is outputted as the ID code to the RD buffer area of the RAM 212 at step #53, and then, the program flow goes to step #54. On the other hand, if the flag ENBID is set at zero (No at step #51) or if the flag LKDPU is not set at zero (No at step #52), the program flow goes to step #54 directly without storing the parameter CRDPU in the RD buffer area of the RAM 212.

At step #54, both the flags DRDPU and LKDPU are set at one so as to indicate that the data has been received. Thereafter, data are inputted from the CCUA 211c at step #55, and the data are written in the RD buffer area of the RAM 212 at step #56. Thereafter, it is judged whether or not the memory capacity Mce of the empty area in the RD buffer area of the RAM 212 is equal to or larger than the predetermined first threshold value Mth1 at step #57.

If the memory capacity Mce of the empty area in the RD buffer area of the RAM 212 is equal to or larger than the predetermined first threshold value Mth1 (Yes at step #57) as shown in FIG. 13, the timer DRTMR is set at the predetermined time $T_{KEEP}$ at step #58 as shown at the timings t15 and t16 of FIG. 12, and the timer RITMR is cleared at step #59 since it is unnecessary to control the reception time interval. Thereafter, the program flow returns.

On the other hand, after writing the received data in the RD buffer area of the RAM 212, if the memory capacity Mce of the empty area of the RD buffer area of the RAM 212 is smaller than the predetermined first threshold value Mth1 (No at step #57) as shown in FIG. 13, the reception enable signal REm is turned off at step #60 in order to inhibit the FMB 2 from receiving data transmitted from one of the DPUs 1A, 1B and 1C, and then, the timer DRTMR is cleared at step #61. Thereafter, the timer RITMR is set at the predetermined time $T_{STEP}$ at step #62 so as to set the time interval upon receiving data, and then, the program flow returns.

(g-5) CCUB Transmission Process

Figure 18:
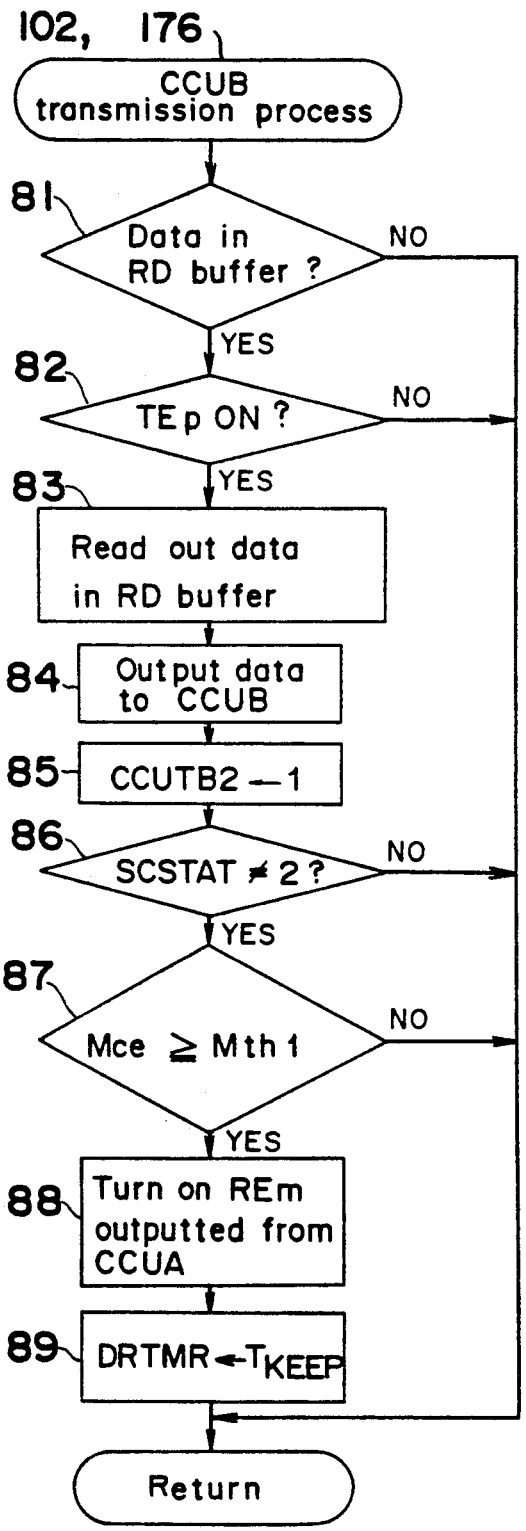

FIG. 18 shows a CCUB transmission process executed in the CCUB transmission interruption process (steps #102 and #176) shown in FIGS. 19 and 22a, which is started when the CCUB 211d has transmitted data completely to the printer system 10.

Referring to FIG. 18, it is judged whether or not data are stored in the RD buffer area of the RAM 212 at step #81, and it is judged whether or not the transmission enable signal TEp for representing whether or not the printer system 10 can receive data is turned on at step #82. If data are not stored in the RD buffer area of the RAM 212 (No at step #81), or if the transmission enable signal TEp is turned off (No at step #82), the program flow returns directly.

On the other hand, if data are stored in the RD buffer area of the RAM 212 (Yes at step #81) and the transmission enable signal TEp is turned on (Yes at step #82), the data stored in the RD buffer area of the RAM 212 are read out at step #83, and are outputted to the CCUA 211d at step #84. Thereafter, the flag CCUTB2 for informing the DPUs 1A, 1B and 1C that the CCUB 211d transmits data is set at one at step #85, and then, it is judged whether or not the parameter SCSTAT is set at two, namely, the DPUs 1A, 1B and 1C are being switched over in the DPU scan process at step #86, and it is judged whether or not the memory capacity Mce of the empty area in the RD buffer area of the RAM 212 is equal to or larger than the predetermined first threshold value Mth1 at step #87.

The data stored in the RD buffer area of the RAM 212 are transmitted to the printer system 10, and if the parameter SCSTAT is not set at two (Yes at step #86) and the memory capacity Mce of the empty area in the RD buffer area of the RAM 212 is equal to or larger than the predetermined first threshold value Mth1 (Yes at step #87) as shown in FIG. 13, the reception enable signal REm outputted from the CCUA 211c is turned on at step #88 since the FMB2 can receive data transmitted from the DPUs 1A, 1B and 1C, and the timer DRTMR is set at the predetermined time $T_{KEEP}$ at step #89. Thereafter, the program flow returns.

On the other hand, if the parameter SCSTAT is set at two (No at step #86), or if the memory capacity Mce of the empty area in the RD buffer area of the RAM 212 is smaller than the predetermined first threshold value Mth1 (No at step #87), the program flow returns without turning on the reception enable signal REm.

(g-6) CCUB Transmission Interruption Process

FIG. 19 shows the CCUB transmission interruption process which is started when the CCUB 211d has transmitted data completely to the printer system 10.

Referring to FIG. 19, first of all, the flag CCUTB2 is reset to zero at step #101, and then, the CCUB transmission process shown in FIG. 18 is executed at step #102. Thereafter, the program flow returns.

(g-7) Printer Status Process

FIGS. 20a, 20b and 20c show the printer status process (step #12) shown in FIG. 15 for processing printer status information which is transmitted from the printer system 10 and is stored in the RP buffer area of the RAM 212.

Referring to FIG. 20a, it is judged whether or not no data are stored in the register TMPREG for temporarily storing the printer status information at step #121. If data such as the printer status information are stored in the register TMPREG (No at step #121), the program flow goes to step #139. On the other hand, if no data is stored in the register TMPREG (Yes at step #121), it is judged whether or not data are stored in the RP buffer area of the RAM 212 at step #124.

If no data is stored in the RP buffer area of the RAM 212 (No at step #124), the program flow returns directly. On the other hand, if data are stored in the RP buffer area of the RAM 212, the data stored in the RP buffer area of the RAM 212 are read out at step #125, resulting in an empty area in the RP buffer area of the RAM 212. Thereafter, it is judged whether or not the reception enable signal REp outputted from the CCUB 211d is turned off at step #126.

If the reception signal REp is turned off (Yes at step #126), the reception signal REp is turned on at step #127, and then, the program flow goes to step #128. On the other hand, If the reception signal REp is turned on (No at step #126), the program flow goes to step #128 directly.

Referring to FIG. 20b, it is judged whether or not the data read out at step #125 are the ID code at step #128. If the data read out at step #125 are the ID code (Yes at step #128), it is judged whether or not a specified DPU is designated by the ID code at step #129. If a specified DPU is designated by the ID code (Yes at step #129), the parameter CTDPU is updated so as to set it at the ID code at step #130, and only the selection signal TDSEL corresponding to the parameter CTDPU is turned on at step #131. Thereafter, the program flow returns.

On the other hand, if a specified DPU is not designated by the ID code (No at step #129), all the selection signals TDSELa, TDSELb and TDSELc are turned on, and then, the program flow returns.

Furthermore, if the data read out at step #125 are not the ID code (No at step #128), it is judged whether or not the data read out at step #125 are the END code at step #133. If the data read out at step #125 are the END code (Yes at step #133), it is judged whether or not the parameter CTDPU has been set at step #134. If the parameter CTDPU has been set (Yes at step #134), only the selection signal TDSEL corresponding to the parameter CTDPU is turned on at step #135, and then, the program flow returns. On the other hand, if the parameter CTDPU has not been set yet (No at step #134), only the selection signal TDSEL corresponding to the parameter CRDPU is turned on at step #136, and then, the program flow returns. This operation is executed since there are many response signals for the DPU to which data are transmitted at present particularly when a specific DPU has not been set yet.

On the other hand, if the data read out at step #125 are not the END code (No at step #133), namely, the data are the printer status information, the data are stored in the register TMPREG at step #138, and then, the program flow goes to step #139.

Referring to FIG. 20c, it is judged whether or not the parameter CTDPU has been set at step #139. If the parameter CTDPU has been set (Yes at step #139), it is judged whether or not the transmission enable signal TE corresponding to the parameter CTDPU is turned on at step #140. On the other hand, if the parameter CTDPU has not been set yet (No at step #139), it is judged whether or not the transmission enable signal TE corresponding to the parameter CRDPU is turned on at step #142.

If the transmission enable signal TE corresponding to the parameter CTDPU is turned off (No at step #140), or if the transmission enable signal TE corresponding to the parameter CRDPU is turned off (No at step #142), the program flow returns. On the other hand, if the transmission enable signal TE corresponding to the parameter CTDPU is turned on (Yes at step #140), or if the transmission enable signal TE corresponding to the parameter CRDPU is turned on (Yes at step #142), data stored in the register TMPREG (referred to as data of the register TMPREG hereinafter) are outputted to the CCUA 211c at step #141, and then, the register TMPREG is cleared at step #143. Thereafter, it is judged whether or not the data of the register TMPREG outputted to the CCUA 211c are a trouble arising code at step #144.

If the data of the register TMPREG are the trouble arising code (Yes at step #144), the flag ERROR for representing whether or not an error occurs in the printer system 10 is set at one at step #145, and then, the program flow returns. On the other hand, if the data of the register TMPREG are not the trouble arising code (No at step #144), it is judged whether or not the data of the register TMPREG are a trouble cancel code at step #146.

If the data of the register TMPREG are the trouble cancel code (Yes at step #146), the flag ERROR is reset to zero at step #147, and then, the program flow returns. If the data of the register TMPREG are not the trouble cancel code (No at step #146), the program flow returns directly.

(g-8) CCUB Reception Interruption Process

FIG. 21 shows the CCUB reception interruption process which is started when the CCUB 211d receives data transmitted from the printer system 10.

Referring to FIG. 21, first of all, data transmitted from the printer system 10 are inputted to the CCUB 211d at step #151, and then, the data are written in the RP buffer area of the RAM 212 at step #152. Thereafter, it is judged whether or not there is an empty area in the RP buffer area of the RAM 212 at step #153.

If there is no empty area in the RP buffer area of the RAM 212 (Yes at step #153), the reception enable signal REp is turned off at step #154 so as to make the CCUB 211d stop receiving data transmitted from the printer system 10, and then, the program flow returns. On the other hand, if there is an empty area in the RP buffer area of the RAM 212 (No at step #153), the program returns directly without turning off the reception enable signal REp.

(g-9) Timer Interruption Process

FIGS. 22a and 22b show the timer interruption process which is started when the timer 211b outputs an interruption signal to the CPU 211a of the MPU 211.

Referring to FIG. 22a, the timer interruption process is composed of:
(1) a counting process of the timer DRTMR at steps #171 and #172;
(2) a counting process of the timer DTTMR at steps #173 and #174;
(3) a transmission process of the CCUB 211d at steps #175 and #176, wherein the CCUB 211d transmits data stored in the RD buffer area of the RAM 212 to the printer system 10; and
(4) a process for controlling the time interval upon receiving data when the memory capacity Mce of the empty area in the RD buffer area of the RAM 212 becomes smaller than the predetermined second threshold value Mth2.

When the timer interruption process is started, first of all, it is judged whether or not the timer DRTMR is operating at step #171. If the timer DRTMR is operating (Yes at step #171), the timer DRTMR is updated, and then, the program flow goes to step #173. On the other hand, the timer DRTMR is not operating (No at step #171), the program flow goes to step #173 directly.

At step 173, it is judged whether or not the timer DTTMR is operating. If the timer DTTMR is operating (Yes at step #173), the timer DTTMR is updated, and then, the program flow goes to step #175. On the other hand, the timer DTTMR is not operating (No at step #173), the program flow goes to step #175 directly.

At step #175, it is judged whether or not the parameter CCUTB2 is set at zero. If the parameter CCUTB2 is set at zero (Yes at step #175), the CCUB transmission process shown in FIG. 18 is executed at step #176, and then, the program flow goes to step #177. On the other hand, if the parameter CCUTB2 is not set at zero (No at step #175), the program flow goes to step #177 directly.

Referring to FIG. 22b, at step #177, it is judged whether or not no error occurs in the printer system 10, namely, the flag ERROR is set at zero, and furthermore, it is judged whether or not the timer RITMR is operating at step #178.

If the any error does not occur in the printer system 10, namely, the flag ERROR is set at zero (Yes at step #177) and the timer RITMR is operating (Yes at step #178), the timer RITMR is updated at step #179, and then, the program flow goes to step #180. On the other hand, if an error occurs in the printer system 10, namely, the flag ERROR is set at one (No at step #177) or if the timer RITMR is operating (No at step #178), the program flow returns directly.

At step #180, it is judged whether or not the timer RITMR has counted up to the preset time, and furthermore, it is judged whether or not the memory capacity Mce of the empty area in the RD buffer area of the RAM 212 is equal to or larger than the predetermined second threshold value Mth2 at step #181.

If the timer RITMR has counted up to the preset time (Yes at step #180) and the memory capacity Mce of the empty area in the RD buffer area of the RAM 212 is equal to or larger than the predetermined second threshoid value Mth2 (Yes at step #181), the reception enable signal REm outputted from the CCUA 211c is turned on at step #182 so as to permit the DPUs 1A, 1B and 1C from transmitting data, and then, the timer DRTMR is set at the predetermined time $T_{STEP}$ at step #183. Thereafter, the program flow returns.

On the other hand, if the timer RITMR has not counted up to the preset time (No at step #180), or if the memory capacity Mce of the empty area in the RD buffer area of the RAM 212 is smaller than the predetermined second threshold value Mth2 (No at step #181), the program flow returns directly.

For example, when data are received by the CCUA 211c in the CCUA reception interruption process shown in FIG. 17 after executing the process of step #182, the memory capacity Mce of the empty area in the RD buffer area of the RAM 212 becomes equal to or larger than the predetermined second threshold value Mth2 and is smaller than the predetermined first threshold value Mth1 (No at step #57 of FIG. 17). Therefore, in order to make the FMB 2 stop receiving data again, the reception enable signal REm is turned off at step #60 of FIG. 17.

Thus, in the case that the memory capacity Mce of the empty area in the RD buffer area of the RAM 212 is equal to or larger than the predetermined second threshold value Mth2 and is smaller than the predetermined first threshold value Mth1, data transmitted from the DPUs 1A, 1B and 1C can be received intermittenly although the data can not be received continuously.

Furthermore, if an error occurs in the printer system 10 (No at step #177), if the timer RITMR is not operating (No at step #178), or if the memory capacity Mce of the empty area in the RD buffer area of the RAM 212 is smaller than the predetermined second threshold value Mth2 (No at step #181), data transmitted from one of the DPUs 1A, 1B and 1C are not received by the CCUA 211c of the MPU 211 of the FMB 2.

(h) Modifications

In the preferred embodiment, three DPUs 1A, 1B and 1C are connected to the electrophotographic printer system 10 having a response function through the FMB 2. However, the present invention is not limited to this. The present invention can be applied to the other apparatuses such as a plotter, a digitizer in place of the printer system 10. Furthermore, the present invention can be applied to an apparatus such as a printer without the response function.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A multiplexer for communicating between a plurality of first apparatuses and a second apparatus, comprising:
   a plurality of first reception means for receiving data from said plurality of first apparatuses, respectively;
   a second reception means for receiving data from said second apparatus, the data received by said second reception means including an identification code for indicating one or more first apparatuses;
   a plurality of first transmission means for transmitting data to said plurality of first apparatuses, respectively;
   second transmission means for transmitting data to said second apparatus;
   first selection means for selecting one of said plurality of first reception means so that the data received by said selected first reception means are transmitted to said second apparatus through said second transmission means;
   second selection means for selecting at least one of said plurality of first transmission means so that the data received by said second reception means are transmitted to at least one of said plurality of first apparatuses through said selected first transmission means; and
   control means for controlling said second means in response to said identification code, said control means being operable in the following first and second operation modes,
   in said first operation mode, said control means enabling said second selection means to select the first transmission means corresponding to the first reception means selected by said first selection means, and
   in said second operation mode, said control means enabling said second selection means to select all of said plurality of first transmission means.

2. A multiplexer as claimed in claim 1, wherein said first selection means selects a next one of said plurality of first reception means when said selected first reception means has completely received the data from its respective first apparatus.

3. A multiplexer as claimed in claim 1, wherein said first selection means selects a next one of said plurality of first reception means when said selected first reception means has not received data for a predetermined time.

4. A multiplexer for communicating between a plurality of first apparatuses and a second apparatus, comprising:
   selection means for selecting one of said plurality of first apparatuses;
   first communication means for receiving data from said first apparatus selected by said selection means and for transmitting the data received from said selected first apparatus to said second apparatus;
   second communication means for receiving data from said second apparatus, the data received from said second apparatus including an identification code for indicating one or all of said first apparatuses, and for transmitting the data received from said second apparatus to said first apparatus selected by said selection means;
   third communication means for receiving data from said second apparatus and for transmitting the data received from said second apparatus to all of said plurality of first apparatuses; and
   control means, in response to said identification code, for selectively actuating one of said second and third communication means according to the data received from said second apparatus.

5. A multiplexer as claimed in claim 4, wherein said selection means selects a next one of said plurality of first apparatuses when the first communication means has completely received the data from said first apparatus selected by said selection means.

6. A multiplexer as claimed in claim 4, wherein said selection means selects a next one of said plurality of first apparatuses when the first communication means has not received data from said first apparatus selected by said selection means for a predetermined time.

7. A multiplexer for communicating between a plurality of data processing units and a printer system, comprising:
   a plurality of first reception means for receiving data from said plurality of data processing units, respectively;
   second reception means for receiving data from said printer system, the data received by said second reception means including an identification code for indicating one or more data processing units;
   a plurality of first transmission means for transmitting data to said plurality of data processing units, respectively;
   second transmission means for transmitting data to said printer system;
   first selection means for selecting one of said plurality of first reception means so that the data received by said selected first reception means are transmitted to said printer system through said second transmission means;

second selection means for selecting at least one of said plurality of first transmission means so that the data received by said second reception means are transmitted to at least one of said plurality of data processing units through said selected first transmission means; and control means for controlling said second selection means in response to said identification code, said control means being operable in the following first and second operation modes, in said first operation mode, said control means enabling said second selection means to select the first transmission means corresponding to the first reception means selected by said first selection means, and in said second operation mode, said control means enabling said second selection means to select all of said plurality of first transmission means.

8. The multiplexer as claimed in claim 7, wherein said first selection means selects a next one of said plurality of first reception means when said selected first reception means has completely received the data from its respective data processing unit.

9. The multiplexer as claimed in claim 7, wherein said first selection means selects a next one of said plurality of first reception means when said selected first reception means has not received data for a predetermined time.

10. A multiplexer for communicating between a plurality of data processing units and a printer system, comprising:

selection means for selecting one of said plurality of data processing units;

first communication means for receiving data from said one data processing unit selected by said selection means and for transmitting the data received from said selected data processing unit to said printer system;

second communication means for receiving data from said printer system, the data received from said printer system including an identification code for indicating one or all of said data processing units, and for transmitting the data received from said printer system to said one data processing unit selected by said selection means;

third communication means for receiving data from said printer system and for transmitting the data received from said printer system to all of said plurality of data processing units; and control means, in response to said identification code, for selectively actuating one of said second and third communication means according to the data received from the printer system.

11. The multiplexer as claimed in claim 10, wherein said selection means selects a next one of said plurality of data processing units when the first communication means has completely received the data from said data processing unit selected by said selection means.

12. The multiplexer as claimed in claim 10, wherein said selection means selects a next one of said plurality of data processing units when the first communication means has not received data from said data processing unit selected by said selection means for a predetermined time.

13. A multiplexer for communicating between a plurality of first apparatuses and a second apparatus, comprising:

a plurality of data reception buses for receiving data from said plurality of first apparatuses, respectively;

a plurality of data transmission buses for transmitting data to said plurality of first apparatuses, respectively;

communication means for communicating data with said second apparatus;

a plurality of data reception gates provided on said plurality of data reception buses, respectively;

a plurality of data transmission gates provided on said plurality of data transmission buses, respectively;

a bus interface connected with said plurality of data reception gates and said plurality of data transmission gates for selectively opening and closing them;

a controller connected with said bus interface for controlling a gate opening operation in first and second operational modes, in said first operation mode, said controller enabling said bus interface to open one of said plurality of data reception gates and one of said plurality of data transmission gates corresponding to each other, and in said second operation mode, said controller enabling said bus interface to open all of said plurality of data transmission gates.

14. The multiplexer as claimed in claim 13, wherein said communication means includes a second data reception bus for receiving data from said second apparatus and a second data transmission bus for transmitting data to said second apparatus.

15. The multiplexer as claimed in claim 14, wherein said communication means includes a second data reception gate provided on said second data reception bus and a second data transmission gate provided on said second data transmission bus.

16. The multiplexer as claimed in claim 13, wherein said controller controls said gate opening operation in response to an identification code which is transmitted from said second apparatus for indicating one or more first apparatuses.

* * * * *